United States Patent [19]
Kardash et al.

[11] Patent Number: 6,153,989
[45] Date of Patent: Nov. 28, 2000

[54] MOTOR DRIVER CIRCUIT FOR DRIVING AND DECELERATING DC MOTORS

[75] Inventors: John Kardash, Ione; Kwong T. Chan, Pleasanton, both of Calif.

[73] Assignee: Quantum Corporation, Milpitas, Calif.

[21] Appl. No.: 09/306,490

[22] Filed: May 6, 1999

[51] Int. Cl.$^7$ ........................................................ H02P 1/18
[52] U.S. Cl. .......................... 318/254; 318/138; 318/245; 318/439; 318/560
[58] Field of Search ..................................... 318/138, 245, 318/254, 439, 437, 607, 778, 798, 807, 685, 696, 139, 560, 561

[56] References Cited

U.S. PATENT DOCUMENTS

| | | | |
|---|---|---|---|
| 5,552,685 | 9/1996 | Young et al. | 318/254 |
| 5,767,654 | 6/1998 | Menegoli et al. | 318/811 |
| 5,866,998 | 2/1999 | Menegoli | 318/254 |
| 5,990,641 | 11/1999 | Van Buul et al. | 318/254 |

*Primary Examiner*—Paul Ip
*Attorney, Agent, or Firm*—Michael Zarrabian

[57] ABSTRACT

A method and apparatus for driving a decelerating a multi-phase wound electric motor having a rotor and multiple phase coils arranged as a stator, wherein each phase coil has a first terminal and a second terminal, and the first terminals of the phase coils are connected together at a center tap. Commutation signals in response to BEMF voltages in the phase coils select a first and a second coil in each commutation state, such that when energized the first and second coils are capable of providing forward torque to the rotor based on the rotational position of the rotor relative to the phase coils. In each commutation state, the second terminal of the first is electrically connected to an upper voltage supply. For applying forward torque to the rotor, the second coil is electrically connecting the second terminal of the second coil to a lower voltage supply, wherein the upper voltage supply is at a higher voltage than the lower voltage supply. Otherwise, to apply reverse torque to the rotor to decelerate the rotor, the second terminal of the second coil is electrically connected to the upper voltage supply during at least a portion of each commutation state, causing a reverse current to flow in the first and second coils to provide reverse torque to the rotor. During each commutation state when the second terminal of the first coil is electrically connected to the upper voltage supply and the second terminal of the second coil is electrically connected to the lower voltage supply, forward current flows in a direction from the first coil to the second coil, inducing forward torque on the rotor. Further, when the second terminals of the first and the second coils are electrically connected to the upper voltage supply during at least a portion of each commutation state, reverse current flows in a direction from the second coil to the first coil, inducing reverse torque on the rotor.

34 Claims, 8 Drawing Sheets

MOTOR DRIVER CIRCUIT FOR DRIVING AND DECELERATING DC MOTORS

FIELD OF THE INVENTION

The present invention relates to motor driver circuits for Direct Current (DC) motors, and in particular to motor driver circuits capable of decelerating DC motors.

BACKGROUND OF THE INVENTION

DC motors are utilized in a variety of systems such as in disk drives. A typical disk drive includes a DC spindle motor for rotating a data disk, and an actuator for moving a head carrier that supports read/write heads radially across the data disk to access data stored on concentric data tracks on the data disk. The spindle motor can be a brushless DC motor having multiple phase coils arranged as a stator, and a rotor having a permanent magnet for rotating, the data disk. During an acceleration phase, the motor is commutated to start from standstill and accelerate to its operational speed. Thereafter, the motor is commutated to maintain that operational speed, by sequentially energizing selected phase coils based on the location of the rotor relative to the phase coils. The energized coils generate forward torque inducing magnetic fields relative to the rotor magnet that rotate the rotor.

In order to ensure that proper phase coils are energized to apply forward torque to the rotor, indirect or sensorless position detection systems, such as back electromotive force ("BEMF") detectors, are utilized to determine the rotor position relative to the phase coils. BEMF detectors sense BFMF voltage transitions in the phase coils, generated by magnetic flux caused by a moving rotor, to identify the proper phase coils to be energized. Specifically, when the rotor is moving, the change in the course and direction of the magnetic field lines emanating from the rotor magnet causes a magnetic flux through the phase coils, inducing a current in the phase coils. The current induced in the phase coils is a function of the rotor speed or the frequency of magnetic transitions in the phase coils due to the magnetic flux through the phase coils. The induced current develops BEMF voltages across resistors electrically connected in series with the phase coils, wherein the BEMF voltages provide rotor position information. Once the rotor position is determined, the motor is commutated by sequentially energizing appropriate phase coils via a coil driver which provides drive currents to the selected phase coils to provide forward torque to the rotor.

The amount of drive current in each coil determines the strength of forward torque inducing magnetic fields and the rotational speed of the rotor. Conventional motor driver circuits typically include a speed controller circuit for controlling the speed of the rotor by controlling the level drive current provided to the selected coils by the coil driver. To accelerate the rotor, the speed controller circuit causes the coil driver to increase the level of drive currents to the selected phase coils, and to reduce the speed of the rotor, the controller causes the coil driver to reduce the level of drive currents to the selected phase coils.

However, a major disadvantage of conventional motor driver circuits is that to reduce the speed of the rotor, the speed controller circuit causes the coil driver to stop driving the selected phase coils so that the rotor coasts to a lower speed. And, in order to stop the rotor, the coil driver reduces the drive currents to zero, whereby the phase coils generate zero torque and the rotor coats to a stop. The amount of time for coasting the rotor to a lower speed or to a stop depends on the rotational speed and inertia of the rotor, friction and the load on the motor.

In many applications it is necessary to shorten the rotor coast time. For example, in disk drives, it is important to quickly bring the disk drive spindle motor to a stop in response to a host stop command. This is because normally read/write heads "glide" over a layer of air above the rotating data disk without touching the data disk. However, below a certain data disk rotational speed, the transducer heads begin to "ride" the data disk, resulting in data disk damage and wear. Reducing the coast time of the rotor shortens the amount of time during which the read/write heads ride the data disk. One method of reducing the coast time has been to short all the phase coils to ground. However, shorting the phase coils to ground causes high current flow in the coils and circuit components, resulting in damage and premature failure.

There is, therefore, a need for a method and circuit for quickly decelerating a brushless DC motor a desired speed or to a stop without causing high current flow in the motor coils and supporting electronics.

BRIEF SUMMARY OF THE INVENTION

The present invention satisfies these needs. The present invention provides a method and apparatus for driving and decelerating a multi-phase wound electric motor. The motor includes a rotor and multiple phase coils arranged as a stator, wherein each phase coil has a first terminal and a second terminal, and the first terminals of the phase coils are connected together at a center tap. In one embodiment, the method of the present invention comprises the steps of generating sequential commutation states in response to BEMF voltages in the phase coils; and selecting at least a first and a second coil in each commutation state, such that when energized the first and second coils are capable of providing forward torque to the rotor based on the rotational position of the rotor relative to the phase coils.

In each commutation state, driving the first coil includes electrically connecting the second terminal of the first coil to an upper voltage supply; and driving the second coil includes the steps of: (i) for applying forward torque to the rotor, electrically connecting the second terminal of the second coil to a lower voltage supply, wherein the upper voltage supply is at a higher voltage than the lower voltage supply, otherwise (ii) for applying reverse torque to the rotor to decelerate the rotor, electrically connecting the second terminal of the second coil to the upper voltage supply during at least a portion of each commutation state, causing a reverse current to flow in the first and second coils to provide reverse torque to the rotor.

During each commutation state when the second terminal of the first coil is electrically connected to the upper voltage supply and the second terminal of the second coil is electrically connected to the lower voltage supply, forward current flows in a direction from the first coil to the second coil, generating magnetic fields around the first and the second coils that apply forward torque on the rotor. Further, when the second terminals of the first and the second coils are electrically connected to the upper voltage supply during at least a portion of each commutation state, reverse current flows in a direction from the second coil to the first coil, generating magnetic fields around the first and the second coils that apply reverse torque to the rotor.

Driving the second coil can be in response to a train of PWM control pulses, wherein each control pulse includes an ON period signal and an OFF period signal. During each commutation state for applying forward torque to the rotor, in response to the ON period signal in each control pulse, the second terminal of the second coil is electrically connected to the lower voltage supply, and in response to the OFF period signal, the second terminal of the second coil is electrically disconnected from the lower voltage supply. Applying reverse torque to the rotor for decelerating the rotor includes the steps of: (1) generating the PWM control pulses during at least a portion of each commutation state wherein the ON period in each PWM control pulse is minimized, and the control pulses provide successive OFF period signals; and (2) in response to each OFF period signal, electrically connecting the second terminal of the second coil to the upper voltage supply, whereby the second terminals of the first and the second coils remain electrically connected to the upper voltage supply during at least a portion of each commutation state to allow BEMF induced currents to flow in the first and second coils, causing reverse torque to the rotor.

Alternatively, applying reverse torque to the rotor can be in response to a deceleration signal and include the steps of: (1) generating the PWM control pulses during at least a portion of each commutation state such that the ON period in each PWM control pulse is minimized, and the control pulses provide successive OFF period signals, and (2) electrically connecting the second terminal of the second coil to the upper voltage supply, whereby the second terminals of the first and the second coils remain electrically connected only to the upper voltage supply during at least a portion of each commutation state to allow BEMF induced currents to flow in the first and second coils, causing reverse torque to the rotor. In either case, during successive OFF periods throughout at least a portion of each commutation state for decelerating the rotor, reverse current flows in the first and second coils in a direction from the second coil to the first coil, generating magnetic fields around the first and the second coils which induce reverse torque to the rotor and oppose rotation of the rotor in the forward direction. As such the motor is rapidly decelerated without shorting all the phase coils to ground and without causing high current flow in the coils and circuit components.

In another aspect the present invention provides a motor driver for driving the electric motor. In one embodiment, the motor driver comprises a commutation phase generation means responsive to BFMF voltages in the phase coils for generating commutation state signals corresponding to a sequence of commutation states for selecting at least a first and a second coil in each commutation state, such that when energized the first and second coils are capable of providing forward torque to the rotor based on the rotational position of the rotor relative to the phase coils; and a coil driver for energizing the selected phase coils.

The motor driver further comprises a coil driver for energizing the selected coils, wherein the coil driver includes a driver circuit responsive to the commutation state signals and to current control signals including a first control signal, a second control signal and a deceleration control signal, for energizing said at least first and second coils. In each commutation state in response to the first control signal the driver circuit electrically connects the second terminal of the first coil to an upper voltage supply by establishing a first current path from the upper voltage supply to the second terminal of the first coil. For applying forward torque to the rotor, in response to the second control signal the driver circuit electrically connects the second terminal of the second coil to a lower voltage supply by establishing a second current path from the lower voltage supply to the second terminal of the second coil, wherein the upper voltage supply is at a higher voltage level than the lower voltage supply, thereby causing a forward current to flow in the first and second coils to provide forward torque to the rotor. Otherwise, in response to the deceleration control signal for applying reverse torque to the rotor, the driver circuit electrically connects the second terminal of the second coil to the upper voltage supply during at least a portion of each commutation state by establishing a third current path from the upper voltage supply to the second terminal of the second coil, causing a reverse current to flow in the first and second coils to provide reverse torque to the rotor.

The coil driver further includes a speed control circuit for: (i) generating said first and second control signals to control the level and direction of the currents flowing in the first and second coils in each commutation state, and (ii) generating the deceleration control signal in response to a deceleration command for decelerating the rotor during at least a portion of each commutation state, whereby the driver circuit establishes the third current path during at least a portion of each commutation state to allow flow of a reverse current in the first and second coils to apply reverse torque to the rotor.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1A:
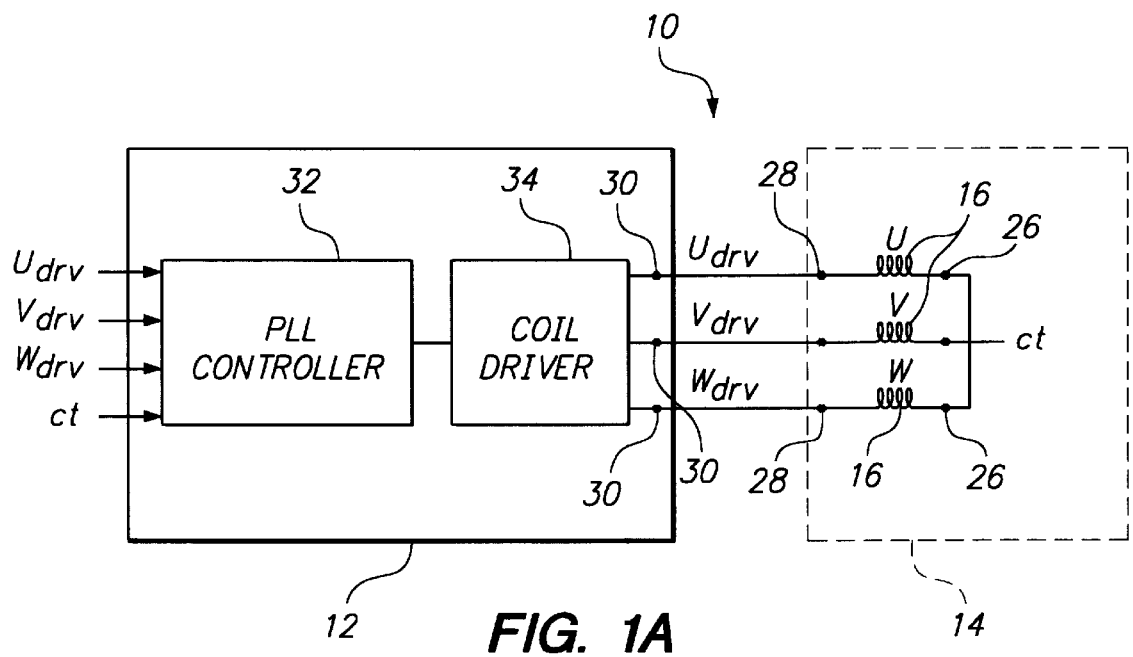
FIG. 1a shows an example block of an embodiment of the architecture of a spindle motor system in which the present invention can be implemented.
Figure 1B:
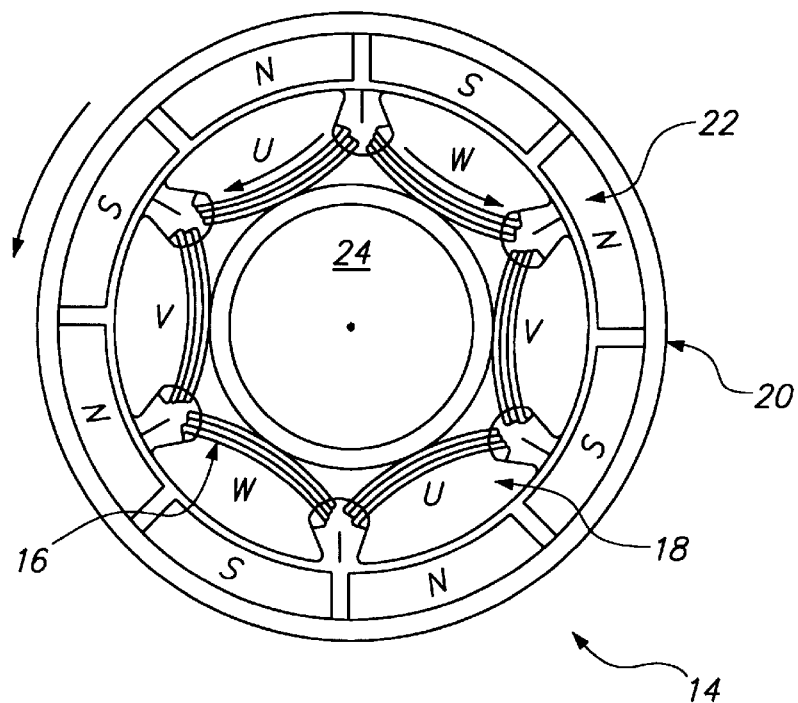
FIG. 1b shows a simplified schematic diagram of an example spindle motor.

FIG. 1a shows an example block diagram of an embodiment of a spindle motor system 10 in which the present invention can be implemented. The spindle motor system 10 comprises a motor driver 12 for driving a three-phase wound spindle motor 14 having multiple phase coils 16. Referring to FIG. 1*b*, in one embodiment, the spindle motor 14 comprises a brushless DC motor having three phase coils 16 designated as U, V and W, arranged as a stator 18, and a rotor 20 comprising a magnet 22. The magnet 22 can include a permanent magnetic ring with eight north and south poles magnetized therein alternately. Alternatively, the magnet 22 can comprise a DC excitation winding including a set of windings positioned on the rotor 20 such that currents applied to the excitation windings create north and south poles alternately. The coils 16 are positioned in a fixed base casting 24, and the rotor 20 is rotatably disposed around the base casting 24. Referring to FIG. 1*a*, each phase coil 16 has a first terminal 26 and a second terminal 28. The first terminals 26 of the coils U, V and W are electrically connected together at a center tap (ct), and the second terminals 28 of the coils U, V and W are coupled to each of three motor terminals 30 forming three motor phases.

In one embodiment, the motor driver 12 comprises a commutation phase generation means such as a phase lock loop controller (PLL) 32 for generating commutation timing signals for selecting at least a first and a second coil in each commutation state such that, when energized the first and second coils are capable of providing forward torque to the rotor 20 based on the rotational position of the rotor 20 relative to the coils 16. The motor driver 12 further comprises a coil driver 34 responsive to the commutation state signals from the PLL controller 32 for energizing the selected coils in each commutation state.

Figure 2:
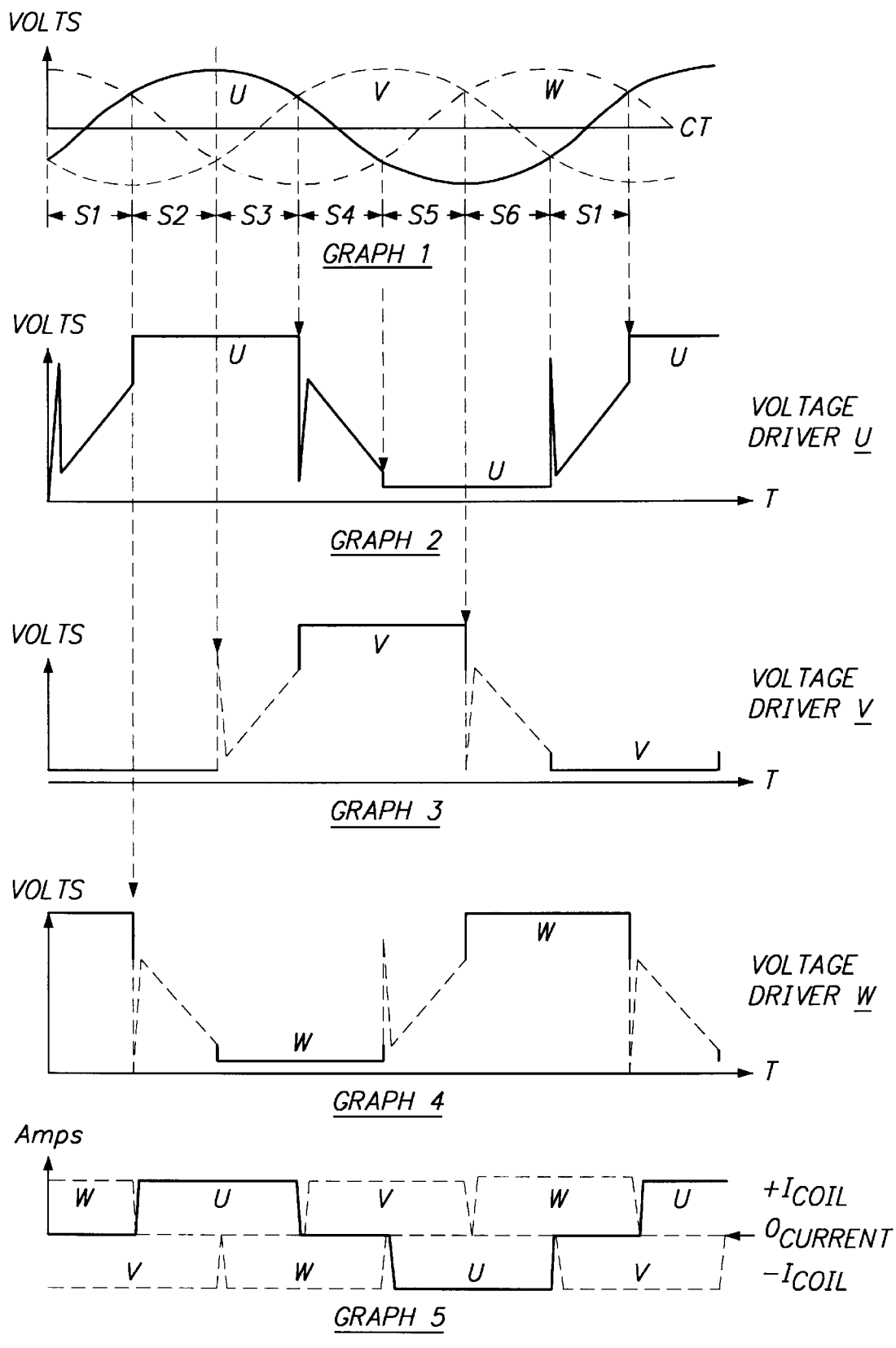
FIG. 2 shows example timing diagrams of freewheeling BEMF coil voltages, drive voltages and current waveforms for the motor coils and their relative positions in time, for applying forward torque to the rotor according to the present invention.

Referring to FIG. 2, Graph 1 shows timing diagram of freewheeling voltage waveforms for the coils U, V and W and their relative positions due to their respective BEMF voltages when each coil is off. The crossing of a waveform across the center tap (ct) is referred to as a zero-crossing. Each coil 16 is electrically connected to a comparator relative to the center tap (ct) to provide the BEMF voltage of the coil 16 to the PLL controller 32. The BEMF voltages from unenergized or off coils 16 are utilized by the PLL controller 32 to determine the rotational position of the rotor 20 relative to the coils 16 and provide commutation timing signals to the coil driver 34 to energize selected coils 16 for application of torque to the rotor 20. The coil driver 34 turns each selected coil 16 on in between two BEMF voltage zero-crossings for the coil 16.

Graphs 2, 3 and 4 in FIG. 2 show timing diagrams of voltage waveforms relative to the center tap (ct) for the coils U, V and W, respectively, when the coil driver 34 energizes the coils U, V and W according to six commutation states S1, S2, S3, S4, S5 and S6 for forward acceleration or "run" conditions. Graph 5 shows waveforms for commutation current levels flowing in the coils U, V and W corresponding to voltage waveforms in Graphs 2, 3 and 4, respectively. In response to commutation timing signals from the PLL, controller 32, in the commutation state S1, the coil driver 34 applies a positive voltage to the coil W, a negative voltage to the coil V, and the coil U floats. In the commutation state S2, the coil driver 34 applies a positive voltage to the coil U, a negative voltage to the coil V, and the coil W floats. In the commutation state S3, the coil driver 34 applies a positive voltage to the coil U, a negative voltage to the coil W, and the coil V floats. In the commutation state S4, the coil driver 34 applies a positive voltage to the coil V, a negative voltage to the coil W, and the coil U floats. In the commutation state S5, the coil driver 34 applies a positive voltage to the coil V, a negative voltage to the coil U, and the coil W floats. And, in the commutation state S6, the coil driver 34 applies a positive voltage to the W coil, a negative voltage to the coil U, and the coil V floats. After the commutation state S6, the sequence repeats beginning with the commutation state S1.

As such, the coil driver 34 sequentially applies the voltages shown in Graphs 2–4 to the coils U, V and W, in the commutation states S1–S6 to selectively generate electric fields around two of the three coils U, V and W in each commutation state to apply forward torque to the rotor 20. The commutation states switch at appropriate times according to the position or phase of the rotor 20 relative to the coils 16 to select coils which when energized apply forward torque to the rotor. The magnitude of currents flowing in the coils U, V and W, controls the amount of torque applied to the rotor 20, and therefore the rotational speed of the rotor 20.

Figure 3:
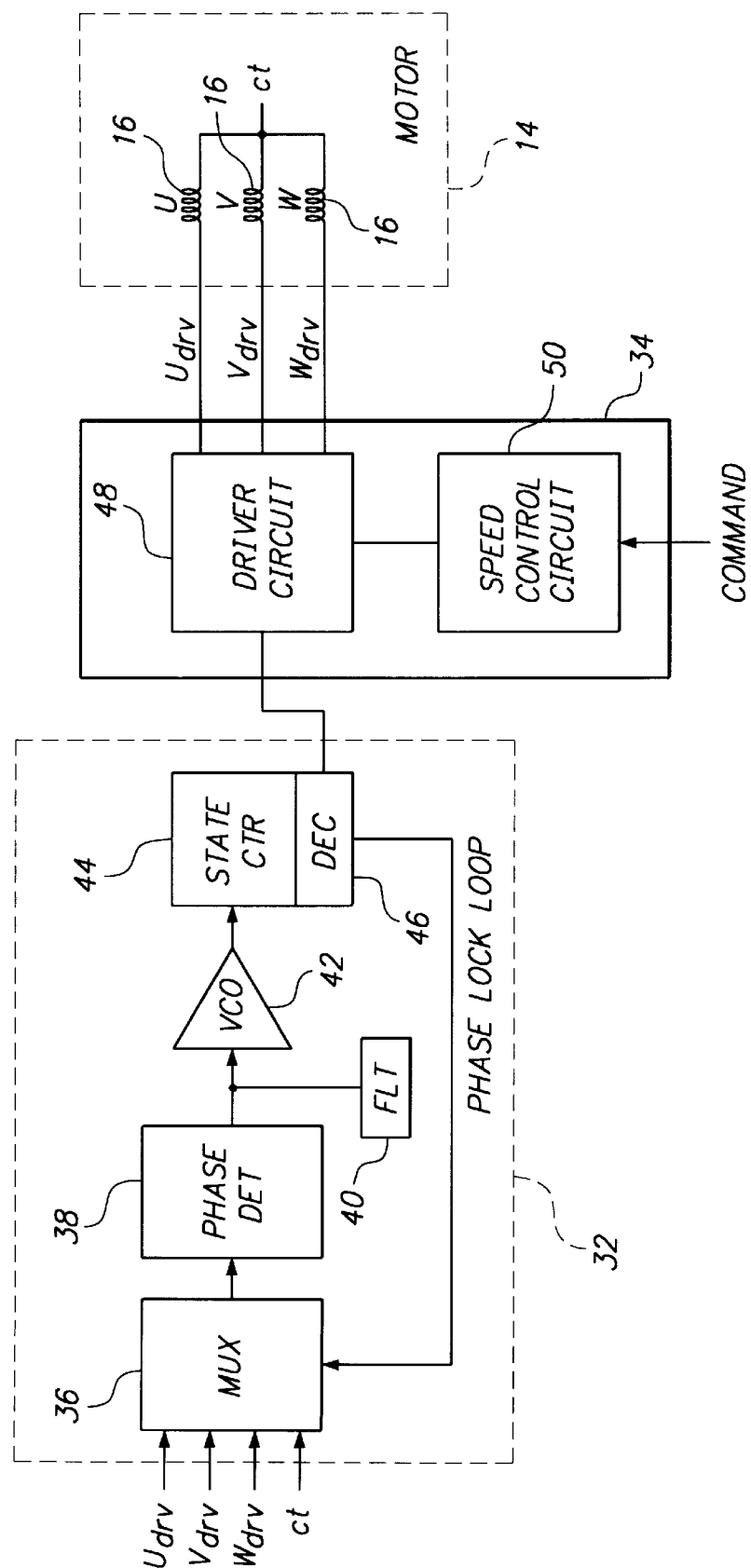
FIG. 3 shows an example block diagram of an embodiment of a phase lock loop controller and a coil driver shown in FIG. 1, according to the present invention.

FIG. 3 shows an example block diagram of an embodiment of the PLL controller 32 and the coil driver 34 for driving the motor 14. The PLL controller 32 comprises a multiplexer switch 36, a phase detector 38, a filter capacitor 40 and a voltage control oscillator (VCO) 42 for generating commutation timing signals. The multiplexer switch 36, coupled to the phase detector 38, sequences BFMF voltages from the coils 16 such that only voltages from the coils 16 in the "off" state are processed by the phase detector 38. Typically the phase detector 38 processes a positive slope of one BENF voltage followed by a negative slope of the next BEMF voltage. This sequencing of slopes causes the phase detector 38 to charge and discharge the filter capacitor 40. The VCO 42 then generates a timing output signal (VCO clock) at a frequency proportional to the voltage across the filter capacitor 40.

The timing output signal of the VCO 42 is coupled to a state counter 44 as a clocking signal, whereby the state counter 44 generate three binary control signals CTL1, CTL2 and CTL3 representing the commutations states S1–S6. The control signals of the state counter 44 are input to a decoder 46 which generates six binary outputs as selection signals corresponding to commutation states S1–S6 for the coil driver 20. The selection signals from the decoder 46 are provided to the multiplexer 36 to sequence the BEMF voltages of the coils 16 to the phase detector 38 so that only combined BEMF voltages from the off coils are provided to the phase detector 38. If said positive and negative BEMF voltage slopes are the same, the filter capacitor 40 remains in equilibrium and the frequency of the output signal of the VCO 42 will remain constant. If the slopes are different, the voltage across the filter capacitor 40 changes, causing the frequency of the output signal of the VCO 42 to change. As such, the VCO 42 will vary its output signal frequency in a direction to maintain a balance of the slopes. The commutation of the motor 14 is timed through the VCO 42 and the PLL controller 32 keeps the commutation frequency in phase with the electrical cycles of the motor 14.

Figure 4:
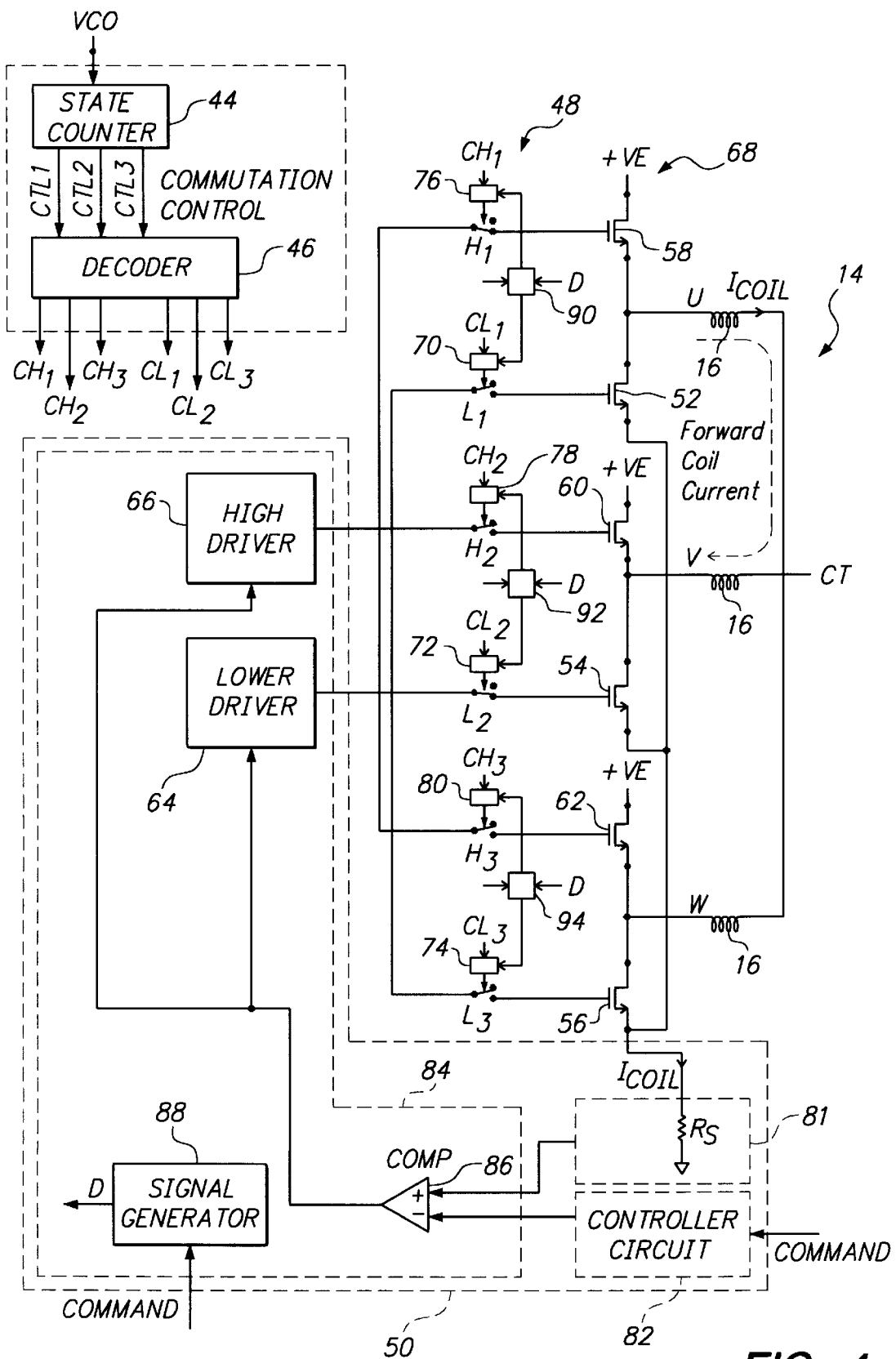
FIG. 4 shows an example detailed block diagram of an embodiment a driver circuit and a speed control circuit shown in FIG. 3, according to the present invention.

The coil driver 34 comprises a driver circuit 48 for applying drive voltages shown in Graphs 2–4 of FIG. 2 to the selected coils according to the selection signals from the decoder 46, thereby generating the corresponding drive currents shown in Graph 5. The coil currents are regulated through another loop which monitors the currents in the coils 16, and therefore the speed of the rotor 20. The coil driver 34 further comprises a speed control circuit 50 for generating control signals to the driver circuit 48 to control the level and direction of the drive currents flowing in the selected coils 16 in each commutation state. FIG. 4 shows an example detailed block diagram of an embodiment of the driver circuit 48 and the speed control circuit 50 of interconnected to the motor 14. The driver circuit 48 comprises six MOS devices 52, 54, 56, 58, 60 and 62, wherein: (1) lower and upper MOS devices 52, 58 are for establishing current paths to energize the coil U, (2) lower and upper MOS devices 54, 60 are for establishing current paths to energize the coil V, and (3) lower and upper MOS devices 56, 62 are for establishing current paths to energize the coil W.

The speed control circuit 50 includes a low driver current controller 64 for generating a first current control signal for the upper MOS devices 58, 60, 62 and a high driver current controller 66 for generating a second current control signal for the lower MOS devices 52, 54, 56, and. Each of the upper MOS devices 58, 60, 62 is for establishing a current path between the second terminals 28 of the corresponding coils U, V, W, respectively, and an upper voltage supply 68 at +VE, in response to the first current control signal. Further, each of the lower MOS devices 52, 54, 56 is for establishing a current path between the second terminals 28 of the corresponding coils U, V, W, respectively, and a lower voltage supply such as ground in response to the second current control signal. The amount of available coil current is a function of the BEMF, coil resistance, and the MOS device impedance.

For each of the coils U, V, W, the sources of the corresponding upper MOS devices 58, 60, 62, respectively, arc coupled to the upper voltage supply 68, the drains of the upper MOS devices 58, 60, 62 are coupled to the second terminal 28 of the respective coils U, V, W, and the gates of the upper MOS devices 58, 60 and 62 are coupled to the high driver current controller 66 via respective upper gate switches H1, H2, H3. Further, for each of the coils U, V, W, the sources of the lower MOS devices 52, 54, 56 are coupled to the second terminals 28 of the respective coils U, V, W, the drains of the lower MOS devices 52, 54, 56 are coupled to ground via a sense resistor Rs, and the gates of the lower MOS devices 52, 54, 56 are coupled to the low driver current controller 54 via respective lower gate switches L1, L2, L3. As described below, in response to the selection signals from the decoder 46, the upper gate switches H1, H2 and H3 connect the high driver current controller 66 to the gates of each of the three upper MOS devices 58, 60, 62 for the coils U, V and W, respectively. Further, in response to the selection signals from the decoder 46, the lower gate switches L1, L2 and L3 connect the low driver current controller 64 to the gates of each of the three lower MOS devices 52, 54, 56 for the coils U, V and W, respectively.

Specifically, the selection signals from the decoder 46, designated as CL1–CL3 and CH1–CH3, are used as commutation state signals for the six commutation states S1–S6 to control the opening and closing of the six gate switches L1–L3 and H1–H3, respectively. The six selection signals CL1, CL2, CL3, CH1, CH2 and CH3 are coupled to six switch controls 70, 72, 74, 76, 78 and 80 for opening and closing the corresponding switches L1, L2, L3, H1, H2 and H3, respectively. For example, when the selection signal CL1 is high, the switch control 70 for the gate switch L1 closes the switch L1, and when the selection signal CL1 is low, said switch control 70 opens the switch L1.

As such, under timing signals from the VCO 42, the state counter 44, through the decoder 46, activates an upper MOS device of a first coil and a lower MOS device of a second coil in each commutation state. Specifically, in the commutation state S1, the selection signals CH3 and CL2 close the gate switches H3 and L2, whereby the first and second current control signals from the high and low a driver current controllers 66, 64 are coupled to the upper MOS device 62 for the coil W, and to the lower MOS device 54 for the coil V, respectively. As such, the coil V is electrically connected to ground and the coil W is electrically connected to the voltage supply 68, whereby coil current flows from the coil W to the coil V and then to the resistor Rs. In the commutation state S2, the selection signals CH1 and CL2 close the gate switches H1 and L2, whereby the first and second current control signals from the high and low driver current controllers 66, 64 are coupled to the upper MOS device 58 for the coil U, and to the lower MOS device 54 for the coil V, respectively. As such, the coil V is electrically connected to ground and the coil U is electrically connected to the voltage supply 68, whereby coil current flows from the coil U to the coil V and then to the resistor Rs. In the commutation state S3, the selection signals CH1 and CL3 close the gate switches H1 and L3, whereby the first and second current control signals from the high and low driver current controllers 66, 64 are coupled to the upper MOS device 58 for the coil U and to the lower MOS device 56 for the coil W, respectively. As such, the coil W is electrically connected to ground and the coil U is electrically connected to the voltage supply 68, whereby coil current flows from the coil U to the coil W and then to the resistor Rs.

Further, in the commutation state S4, the selection signals CH2 and CL3 close the gate switches H2 and L3, whereby the first and second current control signals from the high and low driver current controllers 66, 64 are coupled to the upper MOS device 60 for the coil V and to the lower MOS device 56 for the coil W, respectively. As such, the coil W is electrically connected to ground and the coil V is electrically connected to the voltage supply 68, whereby coil current flows from the coil V to the coil W and then to the resistor Rs. In the commutation state S5, the selection signals CH2 and CL1 close the gate switches H2 and L1, whereby the first and second current control signals from the high and low driver current controllers 66, 64 are coupled to the upper MOS device 60 for the coil V and to the lower MOS device 52 of the coil U, respectively. As such, the coil U is electrically connected to ground and the coil V is electrically connected to the voltage supply 68, whereby coil current flows from the coil V to the coil U and then to the resistor Rs. And, In the commutation state S6, the selection signals CH3 and CL1 close the gate switches H3 and L1, whereby the first and second current control signals from the high and low driver current controllers 66, 64 are coupled to the upper MOS device 62 for the coil W and to the lower MOS device 52 for the coil U, respectively. As such, the coil U is electrically connected to ground and the coil W is electrically connected to the voltage supply 68, whereby coil current flows from the coil W to the coil U and then to the resistor Rs. After the commutation state S6, the sequence repeats beginning with the commutation state S1.

The speed control circuit 50 controls the amount of current in the coils U, V and W, and therefore the speed of the rotor 20. The speed control circuit 50 comprises: (1) a sensor 81 including the sense resistor Rs for sensing the level of current flowing through selected coils in each commutation state, (2) a controller circuit 82 responsive to a speed command for selecting a peak current level corresponding to a desired rotational speed of the rotor, and (3) a current control means 84 for controlling current levels in the selected coils in each commutation state relative to the selected peak current level, to maintain the speed of the rotor 20 at the desired rotational speed.

The current control means 84 comprises a comparator 86 coupled to the sensor 81 and to the controller circuit 82 for comparing sensed current levels to said peak current level, and generating an output signal having a first state where a sensed current level is at or below the peak current level, and a second state where the sensed current level is above the peak current level. The current control means 84 further comprises the high and low driver current controllers 66, 64 for generating the first and second current control signals in response to the output signals of the comparator 86. In response to the first and second current control signals, the MOS devices 58, 60, 62, 64, 66 and 68 modulate said current paths established therethrough in each commutation state to maintain the level of currents through selected coils in each commutation state at or below the peak current level.

The current control means 84 further includes a deceleration signal generator 88 for generating a deceleration control signal D in response to a deceleration command for decelerating the rotor 20. As discussed above, the state counter 44, through the decoder 46, activates an upper MOS device of a first coil and a lower MOS device of a second coil in each commutation state. In response to the deceleration control signal D, the driver circuit 48 electrically connects the second terminals 28 of both the first coil and the second coil to the voltage supply 68 during at least a portion of each commutation state, causing a reverse current to flow from the second coil to the first coil to provide reverse torque to the rotor 20. Specifically, during at least a portion of each commutation state, the driver circuit 48 maintains the gate switch for the lower MOS device of the second coil in an open position, and closes the upper gate switch for the upper MOS device of the second coil to connect the high driver current controller 66 to said upper MOS device to electrically connect the first coil to the voltage supply 68. This causes reverse coil currents to flow from the second coil to the first coil, generating a magnetic flux field around the first and second coils which interact with the permanent flux from the rotor 20 so as to oppose the rotation of that rotor 20 in the same manner as the back electromotive forces in the motor 14.

Controlling the gate switches L1–L3 and H1–H3 in response to the deceleration control signal D is performed via override signals from three recirculation circuits 90, 92 and 94 as follows. For the coil U, the switch controls 70, 76 for the lower and upper gate switches L1, H1 of the lower and upper MOS devices 52, 58, respectively, are: (1) responsive the selection signals CL1 and CH1 from the decoder 46, and (2) responsive to the override signal from the recirculation circuit 90. The recirculation circuit 90 is responsive to the deceleration control signal D and to the selection signal CL1, wherein when the deceleration control signal D and the signal CL1 are both high, the override signal of the recirculation circuit 90 is high; otherwise, the override signal is low. When the override signal of the recirculation circuit 90 is high, the switch control 70 for the lower gate switch L1 opens the gate switch L1, and the switch control 76 for the upper gate switch H1 closes the gate switch H1. As such, the coil U is electrically connected to the voltage supply 68.

For the coil V, the switch controls 72, 78 for the lower and upper gate switches L2, H2 of the lower and upper MOS devices 54, 60, respectively, are responsive to: (1) the selection signals CL2 and CH2 from the decoder 46, and (2) the override signal from the recirculation circuit 92. The recirculation circuit 92 is responsive to the deceleration control signal D and to the selection signal CL2, wherein when the deceleration control signal D and the signal CL2 are both high, the override signal of the recirculation circuit 92 is high; otherwise, the override signal is low. When said override signal of the recirculation circuit 92 is high, the switch control 72 for the lower gate switch L2 opens the gate switch L2, and the switch control 78 for the upper gate switch H2 closes the gate switch H2. As such, the coil V is electrically connected to the voltage supply 68.

For the coil W, the switch controls 74, 80 for the lower and upper gate switches L3, H3 of the lower and upper MOS devices 56, 62, respectively, are responsive to: (1) the selection signals CL3 and CH3 from the decoder 46, and (2) the override signal from the recirculation circuit 94. The recirculation circuit 94 is responsive to the deceleration control signal D and to the selection signal CL3, wherein when the deceleration signal D and the signal CL3 are both high, the override signal of the recirculation circuit 94 is high; otherwise, the override signal is low. When the override signal of the recirculation circuit 94 is high, the switch control 74 for the lower gate switch L3 opens the gate switch L3, and the switch control 80 for the upper gate switch H3 closes the gate switch H3. As such, the coil W is electrically connected to the voltage supply 68.

Figure 5:
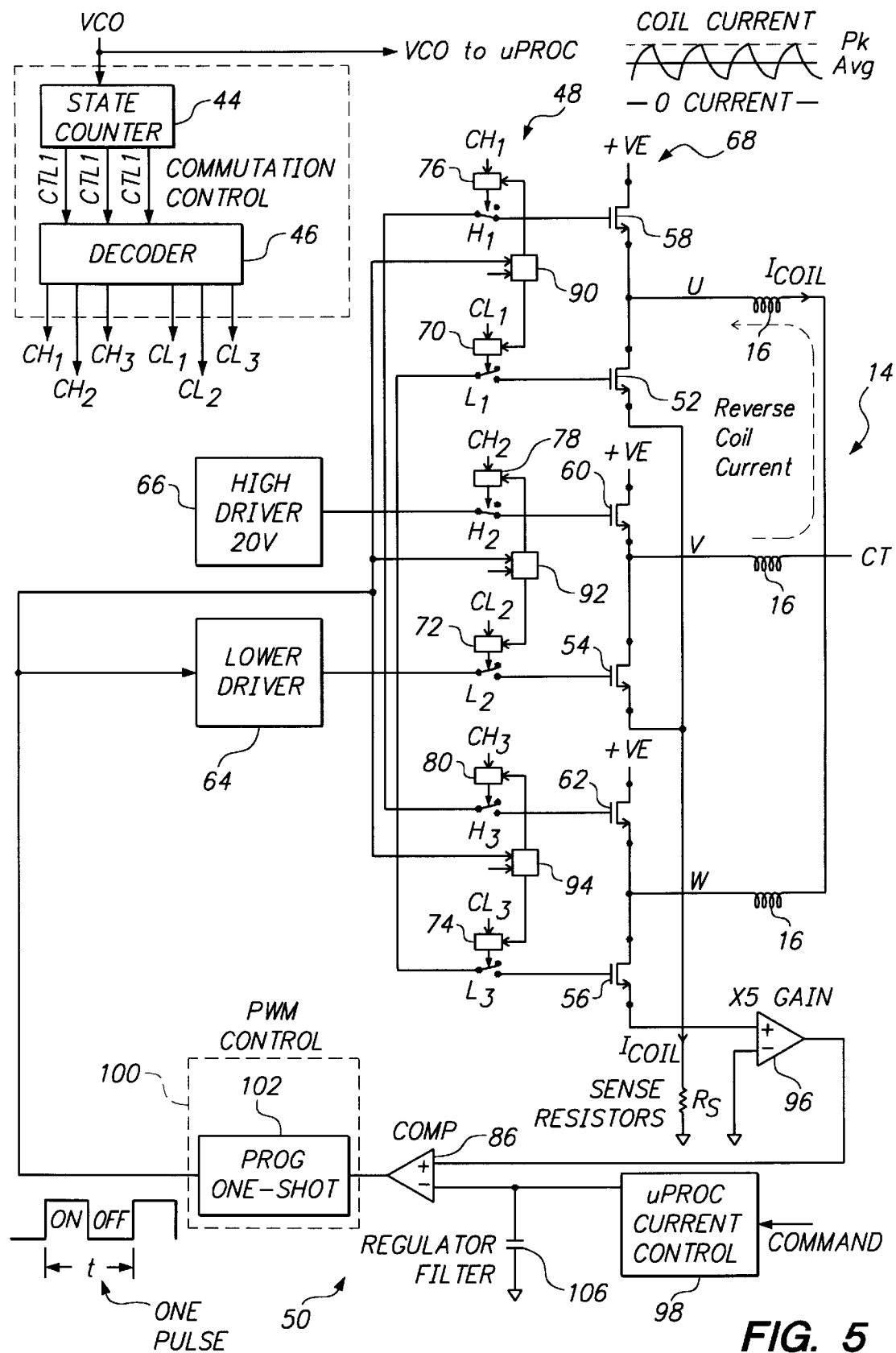
FIG. 5 shows an example schematic diagram of an embodiment of the driver circuit and the speed control circuit of FIG. 4, according to the present invention.

FIG. 5 shows a schematic diagram of the driver circuit 48 and an example embodiment of the speed control circuit 50 of FIG. 4, interconnected to the coils U, V and W. The lower and upper MOS devices 52, 54, 56, 58, 60, 62, the lower and upper gate switches L1–L3 and H1–H3, the switch controls 70, 72, 74, 76, 78, 80, the recirculation circuits 90, 92, 94, the higher and lower driver current controllers 66, 64, the state counter 44 and the decoder 46 are carried over from FIG. 4. The selection signals CL–CL3 and CH1–CH3 from the decoder 46 are used as commutation state signals for the six commutation states S1–S6 to control the opening and closing of the six gate switches L1–L3 and H1–H3 during "run" conditions, as described above. In this embodiment of the invention, the high driver current controller 66 drives the upper MOS devices 58, 60, 62 by applying a constant gate voltage to a selected upper MOS device in each commutation state. And, the low driver current controller 64 drives the lower MOS devices 52, 54, 56 by applying Pulse Width Modulated (PWM) gate voltages to a selected lower MOS device in each commutation state.

The high driver current controller 66 applies fixed gate voltages (e.g., 20 volts) to the gates of the upper MOS devices 58, 60, 62 via the upper gate switches H1, H2 and H3, to turn one of said upper MOS devices on in each commutation state. The upper gate switches H1–H3 are opened and closed in response to the decoder selection signals CH1–CH3, respectively, for selecting one of the upper MOS devices 58, 60 or 62 in each commutation state to connect one of the corresponding coils U, V or W to the voltage supply 68.

A direct or liner mode current control can be utilized to drive the lower MOS devices 52, 54, 56. In the linear mode, the gate voltages of the lower MOS devices 52, 54, 56 are regulated for controlling the level of currents in selected coils in each commutations state to offset the BEMF voltages of the selected coils. For example, the BEMF voltages can be about 8 volts for a coil current of about 0.3 amps. If the voltage supply 68 is at about +VE=12 volts, each lower MOS device endures a 4 volt voltage with a current level of about 0.3 amps. However, this leads to a power dissipation of 1.2 watts. Preferably, PWM is utilized to drive the lower MOS devices 52, 54 and 56 to reduce power dissipation to about 0.22 watts for the above example. In PWM, a train of PWM control pulses are applied to the gates of one of the lower MOS devices 52, 54 and 56 in each commutation state, whereby power to one of the corresponding, coils U, V, W is switched on and off. PWM provides constant average currents to the coils without changing the average current level when the coils U, V, W are energized. Since each coil is an inductive load, a change in current flowing through the inductive load during switching causes the voltage across the load to rise or fall as a ramp. The power dissipated by the load during switching is a function of the duration and amount of current flowing through the load during switching.

The drains of the lower MOS devices 52, 54, 56 are connected together to the sense resistor Rs. The sensor 81 further comprises an amplifier 96 connected across the resistor Rs to amplify the voltage across the resistor Rs due to coil currents in each commutation state. The controller circuit 82 comprises a microprocessor current controller 98 and a regulator filter capacitor 106. A speed command to the microprocessor 98 provides the desired rotational speed of the rotor 20. The microprocessor 98 monitors the VCO output timing signals from the VCO 42 to determine the actual speed of the rotor 20, and adjusts a peak current level, and therefore the resulting peak voltage level across the regulator filter capacitor 106, to maintain the rotor speed at said desired speed. The output voltage of the amplifier 96 and the peak voltage are input to the comparator 86 to control the current flowing through the selected coils in each commutation state, and therefore the speed of the rotor 20. The output of the comparator 86 is input to a pulse generator 100 for generating a train of PWM control pulses to the lower MOS devices 52, 54, 56 for controlling current flow in the selected coils in each commutation state as described further below.

The pulse generator 100 includes a one-shot monostable multivibrator 102, wherein the output of the comparator 86 is coupled to the one-shot 102 for generating said PWM control pulses. The one-shot 102 has a first state in which the one-shot generates an ON output signal for turning a selected lower MOS device on for an ON period, and a second state in which the one-shot 102 generates on OFF output signal for turning the lower MOS device off for an OFF period. For example, each ON period begins with a rising edge of the output signal of the one-shot 102 and lasts so long as the output signal remains high. And, each OFF period begins with a falling edge of the output signal of the one-shot 102 and lasts so long as the output signal remains low. The successive high and low output signals of the one-shot 102 form said train of PWM control pulses during each commutation state, wherein each pulse includes an ON period signal and an OFF period signal. The PWM control pulses from the one-shot 102 are provided to the low driver current controller 64. The output of the lower driver current controller 64 is selectively coupled to the gates of the lower MOS devices 52, 54, 56 via the lower gate switches L1, L2, L3 according to the selection or commutation state signals CL1, CL2 and CL3, respectively. The lower gate switches L1–L3 are opened and closed in response to the commutations state signals CL1–CL3 for selecting one of the lower MOS devices 52, 54, 56 in each commutation state, as described above. The low driver current controller 64 provides gate voltages to the lower MOS devices 52, 54, 56, wherein the level of the gate voltages correspond to said first and second states of the output signal of the one-shot 102 for switching the lower MOS device 53, 54 and 56 on and off.

In each commutation state, while the sense voltage across the resistor Rs is below said peak voltage, the output signal from the comparator 86 keeps the one-shot 102 in the first state for an ON period, whereby the low driver current controller 64 applies a connect gate voltage to a selected lower MOS device, causing the lower MOS device to energize the corresponding coil by establishing a current path from the coil to ground for the ON period. When the sense voltage across the resistor Rs reaches the peak voltage level, the output signal from the comparator 86 places the one-shot 102 in the second state, whereby the low driver current controller 64 applies a disconnect gate voltage to the selected lower MOS device, causing the lower MOS device to disconnect said corresponding coil from ground for a certain OFF period.

For example, the one-shot 102 can be programmed to turn off the gate voltage to a lower MOS device for a prescribed OFF period of about 10 microseconds per PWM control pulse, in each commutation state. The length of the ON period in each PWM control pulse is controlled by the microprocessor 98 such that when the output voltage of the amplifier 96, corresponding to the sense voltage across the resistor Rs, reaches the peak voltage selected by the microprocessor 98, the one-shot 102 is fired to turn off the gate voltage to the lower MOS device for the OFF period. The coil current in the selected coils for the commutation state then decays. After the OFF period of about 10 microseconds, the one-shot turns the lower MOS device on again to allow the selected coils in the commutation state to charge up. As such, the microprocessor regulates the speed of the rotor 20 by changing the peak voltage input to the comparator 86. The motor responds to the average current flowing through the selected coils in each commutation as shown in the coil current graph in FIG. 5. PWM drives the lower MOS devices 52, 54, 56 deep into conduction wherein each MOS device can be represented by a resistance Rdson. The amount of available coil current is a function of the BEMF, coil resistance, and the MOS device impedance. The impedance of each coil is related to the resistance Rdson of the MOS devices in deep conduction. For example, when the motor 14 is in the "run" condition, the level of current in selected coil in each commutation state typically ranges from about 100 milliamps to about 400 milliamps and the BEMF voltage is about 8 volts.

To decelerate the rotor 20, the microprocessor 98 reduces the level of the peak voltage input to the comparator 86 in response to a deceleration command from a host, for example, so that the comparator 86 maintains the one-shot 102 in said first state for an ON period of about zero length per PWM control pulse. Reducing the ON period changes the frequency or the duty cycle of the PWM control pulses. For example, if normally the ON period is about 10 microseconds and the OFF period is about 10 microseconds for a pulse width of 20 microseconds, the duty cycle of the ON period in each PWM pulse is 50%. Reducing the ON period to 5 microseconds changes the duty cycle of the ON period in each PWM pulse to 33% while the OFF period remains constant at 10 microseconds, providing a pulse period of 15 microseconds. This reduced duty cycle causes the average coil currents to be lower.

Therefore, for decelerating the rotor, the microprocessor 98 selects the level of the peak voltage to the comparator 86 for commanding zero current flow in the selected coils in each commutation state to reduce said duty cycle to about zero for at least a portion, or the entire duration, of each commutation state. As such, the one shot 102 provides a set of successive OFF period signals. The total duration of a set of successive OFF periods in each commutation state must be long enough so that transient currents due to self-inductance in the selected coils are dissipated, whereby only currents due to BEMF magnetic flux of the moving rotor 20 flow in the selected coils. This is accomplished, for example, by the microprocessor 98 commanding zero current, and therefore zero peak voltage, for substantially the entire length of each commutation state. During "run" conditions, there can be about ten OFF periods for each commutation state, and the OFF periods are spaced by ON periods of durations determined by the peak voltage as detailed above. A single OFF period abutting two ON periods of lengths appropriate for "run" conditions, is not of sufficient length for the onset of reverse currents and reverse torquing. However, during deceleration, the ON periods are minimal or non-existent, and each commutation state is spanned by a set of successive, adjacent or very closely spaced OFF periods. By commanding zero current for deceleration, the microprocessor 98 effectively discontinues PWM control of the coils 16 and provides only OFF period signals to the motor 14 in each commutation state. Therefore, when the lower MOS device of a coil is selected in a commutation state, during the length of said set successive of OFF periods the lower gate switch for the lower MOS device is opened and the upper gate switch for the upper MOS device of said coil is closed, causing the upper MOS device to electrically connect the coil to the upper voltage supply 68 for the duration of the commutation state. The set of OFF periods in each commutation state results in the coil currents reversing direction and generating a magnetic flux field around the selected coils which interact with the permanent flux from the rotor so as to oppose the rotation of that rotor 20.

In another embodiment of the invention described below, the level of the peak voltage is selected to minimize the ON period and said duty cycle, whereby a selected lower MOS device energizes the corresponding coil for a minimal period to allow the PLL controller 32 to detect BEMF voltages in off coils, and remain in phase with the motor cycles. As such, the comparator 86 maintains the one-shot 102 in said first state for a minimized ON period, minimizing said duty cycle in each current PWM control pulse, whereby the selected lower MOS device energizes the corresponding coil for a minimized period. For example, for an OFF period of about 10 microseconds and an ON period of about 0.5 microseconds, said duty cycle is the about 4.76%. And, the microprocessor 98 provides a peak voltage of about 0.15 volts to the comparator 86 out of possible 3 volts to achieve the minimum ON period of 0.5 microseconds per PWM control pulse.

Referring to FIG. 5, the output signal from the one-shot 102 is coupled to the recirculation circuits 90, 92, 94. For the coil U, while the output signal of the one-shot 102 is low, indicating an OFF period, and while the CL1 signal is high, the override signal of the recirculation circuit 90 is high; otherwise, the override signal is low. The switch controls 70, 76 for the lower and upper gate switches L1, H1 of the lower and upper MOS devices 52, 58, respectively, are responsive to: (1) the selection signals CL1 and CH1 from the decoder 46, and (2) the override signal from the recirculation circuit 90. When the override signal from the recirculation circuit 90 is high, the switch control 70 for the lower gate switch L1 opens the gate switch L1, and the switch control 76 for the upper gate switch H1 closes the gate switch H1. As such, the coil U is electrically connected to the voltage supply 68 for the duration of a corresponding commutation state.

For the coil V, while the output signal of the one-shot 102 is low, indicating an OFF period, and while the CL2 signal is high, the override signal of the recirculation circuit 92 is high; otherwise, the override signal is low. The switch controls 72, 78 for the lower and upper gate switches L2, H2 of the lower and upper MOS devices 54, 60, respectively, are responsive to: (1) the selection signals CL2 and CH2 from the decoder 46, and (2) the override signal from the recirculation circuit 92. When the override signal is high, the switch control 72 for the lower gate switch L2 opens the gate switch L2, and the switch control 78 for the upper gate switch H2 closes the gate switch H2. As such, the coil V is electrically connected to the voltage supply 68 for the duration of a corresponding commutation state.

For the coil W, while the output signal of the one-shot 102 is low, indicating an OFF period, and while the CL3 signal is high, the override signal of the recirculation circuit 94 is high; otherwise, the override signal is low. The switch controls 74, 80 for the lower and upper gate switches L3, H3 of the lower and upper MOS devices 56, 62, respectively, are responsive to: (1) the selection signals CL3 and CH3 from the decoder 46, and (2) the override signal from the recirculation circuit 94. When the override signal is high, the switch control 74 for the lower gate switch L3 opens the gate switch L3, and the switch control 80 for the upper gate switch H3 closes the gate switch H3. As such, the coil W is electrically connected to the voltage supply 68 for the duration of a corresponding commutation state.

Therefore, during deceleration, in the commutation state S1, the gate switches H2 and H3 are closed, whereby the gate voltages from the high driver current controller 66 are coupled to the upper MOS devices 60, 62 of the coils V and W, respectively. As such, the second terminal 28 of each of the coils V and W are electrically connected to the voltage supply 68, whereby reverse coil current flows from the coil V to the coil W. Because both coils V and W are held at the positive voltage level +VE of the voltage supply 68 during the commutation state, the direction of the BEMF current through the coils V and W bring the center tap (ct) negative, and reverse coil current flows from the coil V to the coil W due to the BEMF. The reverse coil current generates flux in the coils W and V which oppose the magnetic flux from the rotor 20, and oppose forward rotation of the rotor 20. In the commutation state S2, the gate switches H2 and H1 are closed, whereby the gate voltages from the high driver current controller 66 are coupled to the upper MOS devices 60, 58 of the coils V and U, respectively. As such, the second terminal 28 of each of the coils V and U are electrically connected to the voltage supply 68 during the commutation state, whereby reverse coil current flows from the coil V to the coil U. In the commutation state S3, the gate switches H3 and H1 are closed, whereby the gate voltages from the high driver current controller 66 are coupled to the upper MOS devices 62, 58 of the coils W and U, respectively. As such, the second terminal 28 of each of the coils W and U are electrically connected to the voltage supply 68 during the commutation state, whereby reverse coil current flows from the coil W to the coil U.

Further, in the commutation state S4, the gate switches H3 and H2 are closed, whereby the gate voltages from the high driver current controller 66 are coupled to the upper MOS devices 62, 60 of the coils W and V, respectively. As such, the second terminal 28 of each of the coils W and V are electrically connected to the voltage supply 68 during the commutation state, whereby reverse coil current flows from the coil W to the coil V. In the commutation state S5, the gate switches H1 and H2 are closed, whereby the gate voltages from the high driver current controller 66 are coupled to the upper MOS devices 58, 60 of the coils U and V, respectively. As such, the second terminal 28 of each of the coils U and V are electrically connected to the voltage supply 68 during the commutation state, whereby reverse coil current flows from the coil U to the coil V. In the commutation state S6, the gate switches H1 and H3 are closed, whereby the gate voltages from the high driver current controller 66 are coupled to the upper MOS devices 58, 62 of the coils U and W, respectively. As such, the second terminal 28 of each of the coils U and W are electrically connected to the voltage supply 68 during the commutation state, whereby reverse coil current flows from the coil U to the coil W. After the commutation state S6, the sequence repeats beginning with the commutation state S1.

Under PWM control, during "run" condition when the microprocessor 98 is not selecting zero current, in each commutation state a first coil is electrically connected to the voltage supply 68 through the upper MOS device for the first coil, and a second coil is electrically connected to the sense resistor Rs through the lower MOS device for the second coil during each ON period. As such, forward coil current flows from the voltage supply 68 through the first and second coils and the resistor Rs to ground. When the coil current in the sense resistor Rs rises such that the level of output voltage of the amplifier 96 reaches the peak voltage selected by the microprocessor 98, the lower gate switch for the lower MOS device of the second coil is opened and the upper gate switch for the upper MOS device of the second coil is closed for the OFF period. As such the lower MOS device is turned off, disrupting forward current from the first coil to the second coil, and the upper MOS device is turned on to electrically connect the second coil to the voltage supply 68.

When the lower gate switch is opened, a inductive "flyback" current flows through the second coil because disrupting the flow of forward current turns the second coil positive. Without the recirculation circuits 90, 92, 94, a diode across the upper MOS device of the second coil channels the flyback current to the voltage supply 68. However, utilizing the recirculation circuits 90, 92, 94, closing the upper gate switch turns the upper MOS device on and electrically connects the second coil to the voltage supply 68 to suppress the flyback current by allowing a reverse current to flow from the second coil to the first coil.

For example, using the recirculation circuit 90 for normal "run" conditions, in a commutation state selecting the coil U for electrical connection to ground, during the ON period of each PWM control pulse the gate switch L1 is closed to turn on the lower MOS device 52 while the gate switch H1 remains open, and then during the OFF period of each PWM control pulse the gate switch L1 is opened and the gate switch H1 is closed. During the ON period, the current in the coil U rises exponentially to the peak current level set by the microprocessor 98. When the voltage across the resistor Rs reaches the peak voltage, the lower MOS device 52 is turned off by opening the gate switch L1 and the upper MOS device 58 is turn on by closing the upper gate switch H1 for the OFF period to allow the current in the coil U to decay.

In an alternative embodiment, when the CL1 selection signal is high and the lower MOS device 52 of the coil U is selected, during the ON period of a PWM pulse, the lower gate switch L1 remains closed and the upper gate switch H1 is open. During the OFF period the upper gate switch H1 is closed to connect the high driver current controller 66 to the gate of the upper MOS device 58 and turn the upper MOS device 58 on to connect the coil U to the voltage supply 68. During the OFF period, the gate switch L1 remains closed, however, in response to the OFF signal of the PWM control pulse, the low driver current controller 64 turns the lower MOS device 52 off, electrically disconnecting the coil U from ground. The effect is similar to opening the gate switch L2.

An equivalent scenario is repeated for the coils V and W when their lower MOS devices 54, 56 are selected by selection signals CL2 and CL3, respectively, during respective commutation states. Specifically, when the CL2 selection signal is high, whereby the lower MOS device 54 of the coil V is selected, during the ON period of a PWM pulse, the lower gate switch L2 remains closed and the upper gate switch 112 is open. During the OFF period the upper gate switch H2 is closed to connect the high driver current controller 66 to the gate of the upper MOS device 60 and turn the upper MOS device 60 on to connect the coil V to the voltage supply 68. During the OFF period, the gate switch L2 remains closed, however, in response to the OFF period signal of the PWM pulse, the low driver current controller 64 turns the lower MOS device 54 off, electrically disconnecting the coil V from ground. Similarly, when the CL3 selection signal is high, whereby the lower MOS device 56 of the W coil is selected, during the ON period of a PWM pulse, the lower gate switch L3 remains closed and the upper gate switch H3 is open. During the OFF period the upper gate switch H3 is closed to connect the high driver current controller 66 to the gate of the upper MOS device 62 and turn the upper MOS device 62 on to connect the coil W to the voltage supply 68. During the OFF period, the gate switch L3 remains closed, however, in response to the OFF period signal of the PWM pulse, the low driver current controller 64 turns the lower MOS device 56 off, electrically disconnecting the coil W from ground. During the OFF period the one-shot 102 does not signal the low driver current controller 64 to turn the lower MOS devices on.

In either embodiment, to decelerate the rotor in response to the deceleration command, the microprocessor 98 commands zero current flow in the coils by selecting a corresponding peak voltage (e.g., 0 volts) during each commutation state such that the number OFF periods in successive PWM control pulses during at least a portion, or all, of the commutation state is maximized. Preferably, a lower MOS device selected in each commutation state remains off during substantially the entire commutation state while the corresponding upper MOS device remains on during the commutation state. This provides reverse torque to the rotor during the entire commutation state.

Figure 6A:
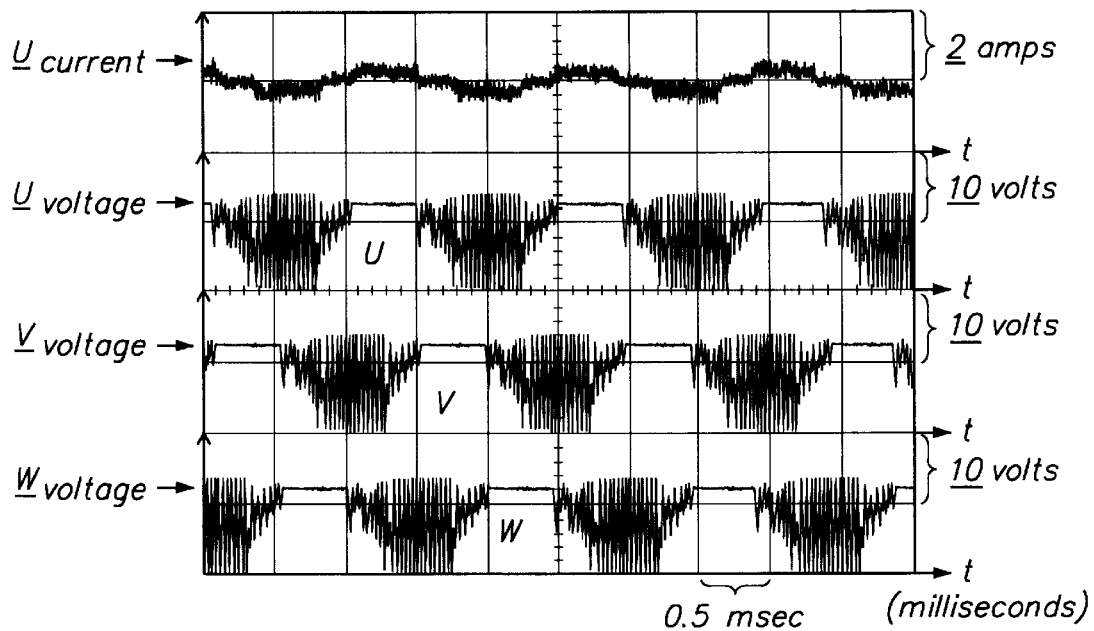
FIG. 6a shows an example graph of the coil current waveform for a coil U and graphs of corresponding coil voltage waveforms for coils U, V, and W, for applying forward torque to the rotor utilizing Pulse Width Modulation for driving the coils according to the present invention.
Figure 6B:
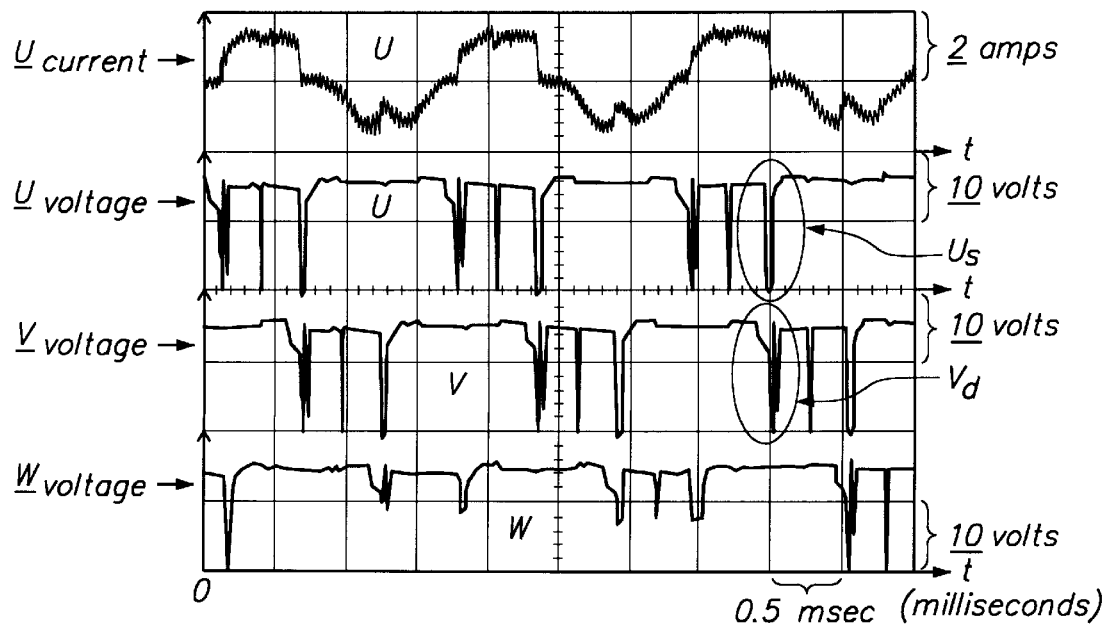
FIG. 6b shows an example graph of the coil current waveform for the coil U and graphs of corresponding coil voltage waveforms for the coils U, V, and W, during deceleration, according to the present invention.

FIG. 6a shows an example waveforms of the coil current for the coil U and waveforms of corresponding coil voltages for the coils U, V, and W, during successive commutation states under normal PWM "run" conditions where the peak coil current commanded by the microprocessor 98 is not zero. FIG. 6b shows an example waveforms of the coil current for the coil U and waveforms of corresponding coil voltages for the coils U, V, and W, during deceleration where the coil current commanded by the microprocessor 98 is substantially zero. Preferably, at the beginning of each commutation state, one of the corresponding recirculation circuits 90, 92, 94 momentarily turns on the lower MOS device selected for the commutation state as a means of allowing the PLL controller 32 to stay in phase with motor cycles.

Referring to the waveform for the voltage in the coil V in FIG. 6b, a voltage drop Vd in the voltage of the coil V is shown, and referring to the waveform for the voltage of the coil U, a voltage spike Us in the voltage of the coil U is shown. The voltage spike Us occurs at a commutation state where the coil U is turning off and the coil V is turning on. The voltage spike Us begins when the coil U is switched off at the end of the commutation state S1, and ends when the coil U is at a peak voltage. The width of the voltage spike Us is a function of the level of current in the coil U at the commutation state S6. If the commutation timing of the PLL controller 32 is slower than the cycles of the motor, the width of the voltage spike Us increases to speed up the commutation timing. The voltage drop Vd represents the BEMF voltage of the off coil V at the commutation state S6. The voltage drop Vd begins when the coil V is turned off from the voltage supply 68 at the end of commutation state S6 and ends when the commutation state S1 begins.

The phase detector 38 processes the voltage spikes Vs and the voltage drops Vd to charge and discharge the filter capacitor 40. The voltage drop Vd relative to center tap causes the phase detector 38 to discharge the filter capacitor 40, and the voltage spike Us causes the phase detector 38 to charge the filter capacitor 40, whereby through the output timing signals from the VCO 42, the commutation state signals of the PLL controller 32 track the motor cycles. When the voltage drop Vd is aligned with the voltage spike Us, charging and discharging of the capacitor 40 is balanced and the timing of the commutations by the PLL controller 32 tracks the motor cycles. The voltage spike Us and the voltage drop Vd balance one another. If the width of the voltage spike Us increases, it causes a decrease in the width of the voltage drop Vd, thereby allowing the PLL controller 32 to track the motor as the motor decelerates.

Specifically, the phase detector 38 utilizes BEMF voltage of the off coil V to discharge the capacitor 40. Then when the commutation state S1 begins, the lower MOS driver 52 for the coil U is turned on momentarily and the phase detector 38 utilizes the voltage of the coil U to charge the capacitor 40. Therefore, in the previous commutation state S6, the BEMF voltage of the coil V causes the phase detector 38 to discharge the capacitor 40 and in the subsequent commutation state S1 the BEMF voltage of the coil U causes the phase detector 38 to charge the capacitor 40. A similar scenario applies in successive commutation states where the recirculation for reverse torquing turns on the selected lower MOS device momentarily for the PLL controller 32 to stay in phase with the motor cycles as described above.

Figure 6C:
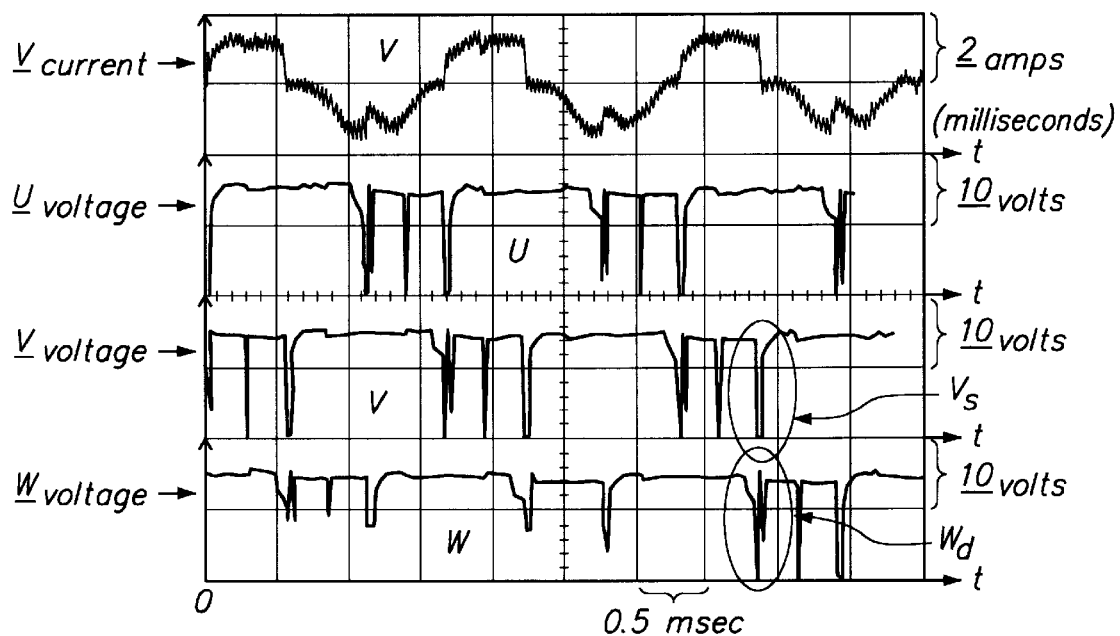
FIG. 6c shows another example graph of the coil current waveform for the coil V and graphs of corresponding coil voltage waveforms for the coils U, V, and W, during deceleration, according to the present invention.

FIG. 6c shows another example waveform of the coil current for the coil V, and waveforms of corresponding coil voltages for the coils U, V, and W, during deceleration where the peak coil current commanded by the microprocessor 98 is substantially zero. Referring to the waveform for the voltage in the coil W, a voltage drop Wd in the voltage of the coil W is shown, and referring to the waveform for the voltage of the coil V, a voltage spike Vs in the voltage of the coil V is shown. The voltage spike Vs occurs at a commutation where the coil V is turning off and the coil W is turning on. The voltage spike Vs begins when the coil V is switched off at the end of the commutation state S3, and ends when the coil V is at peak voltage value. The width of the voltage spike Vs is a function of the level of current in the coil V at the commutation state S2. If the commutation timing of the PLL controller 32 is slower than the cycles of the motor, the width of the voltage spike Vs increases to speed up the commutation timing. The voltage drop Wd represents the BEMF voltage of the off coil W at the commutation state S2. The voltage drop Wd begins when the coil W is turned off from the voltage supply 68 at the end of commutation state S2 and ends when the commutation state S3 begins.

The phase detector 38 processes the voltage spikes Vs and the voltage drops Wd to charge and discharge the filter capacitor 40. The voltage drop Wd relative to center tap causes the phase detector 38 to discharge the filter capacitor 40, and the voltage spike Vs causes the phase detector 38 to charge the filter capacitor 40, whereby through the output timing signals from the VCO 42 the commutation state signals of the PLL controller 32 remain in phase with the motor cycles.

Specifically, the phase detector 38 utilizes BEMF voltage of the off coil W to discharge the capacitor 40. Then when the commutation state S3 begins, the lower MOS driver 54 for the coil V is turned on momentarily and the phase detector 38 utilizes the voltage of the coil V to charge the capacitor 40. Therefore, in the commutation state S2 the BEMF voltage of the coil W causes the phase detector 38 to discharge the capacitor 40 and in the subsequent commutation state S3 the BEMF voltage of the coil V causes the phase detector 38 to charge the capacitor 40.

The multiplexor 36 controls routing of BEMF voltage slopes from the coils U, V and W during successive commutation states. Referring to the coil voltage waveforms of FIGS. 6b and 6c, each transient voltage spike (e.g. spiking about 12 volts) for each of the coils U, V and W indicates where the commutation takes place, triggering the multiplexer 36 to route BEMF voltages from the off coils to the phase detector 38. For example, a voltage drop Vd from 11 volts to about 10 volts is routed to the phase detector 38 until the next commutation state S6 switches the multiplexer 36 for the next commutation state S1. For the commutation state S1, the multiplexer 36 routes a portion of the voltage spike Us ranging from 0 volts to about 11 volts to the phase detector 38 for the commutation state S1.

For deceleration, switching from a lower MOS device 52, 54, 56 to the corresponding upper MOS device 58, 60, 62, respectively occurs only when the lower MOS devices 52, 54, 56 are switching phase. The commutation of the upper MOS devices 58, 60, 62 occurs as normal for "run" conditions, can be either through direct current or PWM. This assures that the maximum voltage across the selected coils in each commutation state is that produced by the BEMF. The BEMF causes a reversal of current since the second terminals 28 of the selected coils are held high at +VE of the voltage supply 68, and only the BEMF induces coil currents. Specifically, the BEMF always induces coil currents in a direction which generate flux for stopping the rotor 20. This is because BEMF is always the load on the motor 14 and when the second terminals 28 of the selected coils are connected to the voltage supply 68, the BEMF induces a current in the selected coils in a reverse direction which opposes the motion of the forward rotor 20. The PLL controller 32 remains synchronized with the motor 14 and commutation provides the necessary switching of lower and higher MOS devices while the motor speed is quickly being reduced. The synchronization allows proper reversal of current and hence application of reverse torque to the rotor while the motor is decelerating. As such the rotor 20 is rapidly decelerated without shorting all the phase coils U, V and W to ground and without causing high current flow in the coils and circuit components.

Figure 7:
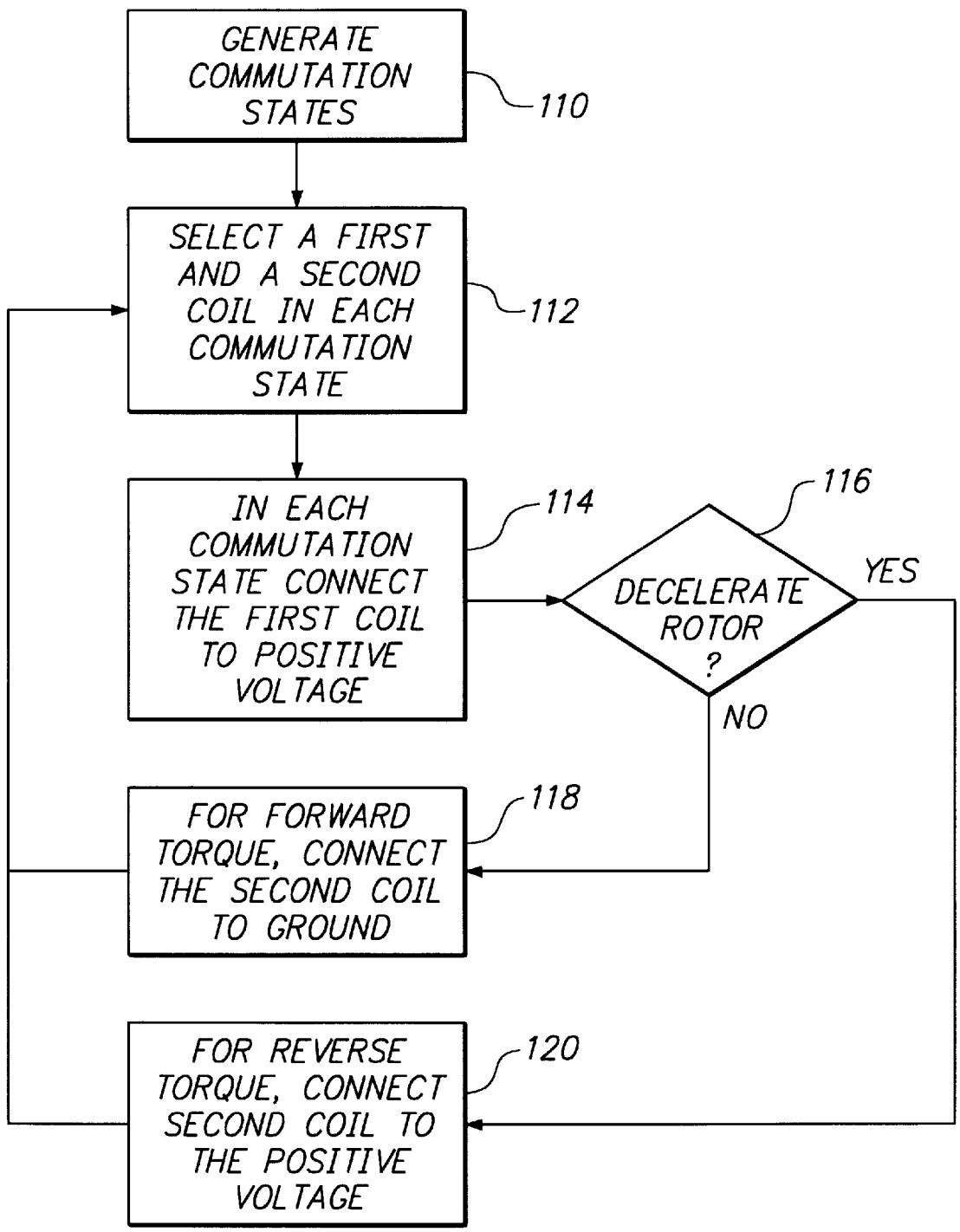
FIG. 7 shows an example flowchart of the steps of an embodiment of a method of driving a brushless DC motor according to another aspect of the present invention.

In another aspect, the present invention provides a method of driving the motor 14. Referring to FIG. 7, in one embodiment, the method of the present invention includes the steps of: generating sequential commutation states in response to BEMF voltages in the phase coils 16 (step 110); selecting at least a first and a second coil in each commutation state, such that when energized the first and second coils are capable of providing forward torque to the rotor 20 based on the rotational position of the rotor 20 relative to the phase coils (step 112); and in each commutation state: driving the first coil by electrically connecting the second terminal 28 of the first coil to the upper voltage supply 68 (step 114); and driving the second coil by: (a) if deceleration is not requested (step 116), for applying forward torque to the rotor 20, electrically connecting the second terminal 28 of the second coil to a lower voltage supply such as ground (step 118), otherwise (b) for applying reverse torque to the rotor 20 to decelerate the rotor 20, electrically connecting the second terminal 28 of the second coil to the upper voltage supply 68 during at least a portion of each commutation state, causing a reverse current to flow from the second coil to the first coil to provide reverse torque to the rotor 20 (step 120).

During each commutation state, when the second terminal 28 of the first coil is electrically connected to the upper voltage supply 68 and the second terminal 28 of the second coil is electrically connected to ground, forward current flows in a direction from the first coil to the second coil, inducing forward torque on the rotor; and when the second terminals 28 of the first and the second coils are electrically connected to the upper voltage supply 68 during at least a portion of each commutation state, reverse current flows in a direction from the second coil to the first coil, inducing reverse torque on the rotor 20.

As discussed above, the step of driving the second coil can be by direct current control or in response to a train of PWM control pulses, each control pulse including an ON period signal and an OFF period signal. Under PWM control, during each commutation state for applying forward torque to the rotor, in response to the ON period signal in each control pulse the second terminal of the second coil is electrically connected to ground, and in response to the OFF period signal the second terminals of the second coil is electrically disconnected from ground, cutting forward current flow from the voltage supply 68 through the first and the second coils to ground.

To apply reverse torque to the rotor, includes generating the PWM control pulses during at least a portion of each commutation state such that the ON period in each PWM control pulse is minimized, and the control pulses provide successive OFF period signals. In response to each OFF period signal, the second terminal of the second coil is electrically connected to the upper voltage supply 68. The second terminals 28 of the first and the second coils remain electrically connected to the upper voltage supply 68 during said at least a portion, or all, of each commutation state to allow BEMF induced currents to flow in the first and second coils, causing reverse torque to the rotor. During successive OFF periods throughout at least a portion of each commutation state for decelerating the rotor, reverse current flows in the first and second coils in a direction from the second coil to the first coil, generating magnetic fields around the first and the second coils which induce reverse torque on the rotor and oppose rotation of the rotor in the forward direction. For example, generating the train of PWM control pulses to decelerate the rotor can include generating the control pulses wherein the length of the ON period in each control pulse is substantially zero and the PWM control pulses include only successive OFF period signals during at least a portion, and preferably all, of each commutation state.

Alternatively, the PWM control pulses are generated during at least a portion of each commutation state wherein the ON period in each PWM control pulse is minimized, and the PWM control pulses provide successive OFF period signals, and in response to a deceleration control signal the second terminal of the second coil is electrically connected to the upper voltage supply 68. As such, the second terminals of the first and the second coils remain electrically connected only to the upper voltage supply 68 during said at least a portion of each commutation state to allow BEMF induced currents to flow in the first and second coils, causing reverse torque to the rotor 20.

Although the present invention has been described in considerable detail with regard to the preferred versions thereof, other versions are possible. Therefore, the appended claims should not be limited to the descriptions of the preferred versions contained herein.

What is claimed is:

1. A motor driver for a multi-phase wound electric motor having a rotor and multiple phase coils arranged as a stator, each phase coil having a first terminal and a second terminal, wherein the first terminals of the phase coils are connected together at a center tap, the motor driver comprising:

(a) a commutation phase generation means responsive to BEMF voltages in the phase coils for generating commutation state signals corresponding to a sequence of commutation states for selecting at least a first and a second coil in each commutation state, such that when energized said at least first and second coils are capable of providing forward torque to the rotor based on the rotational position of the rotor relative to the phase coils;

(b) a coil driver for energizing the phase coils, the coil driver comprising:

(1) a driver circuit responsive to said commutation state signals and to current control signals including a first control signal, a second control signal and a deceleration control signal, for energizing said at least first and second coils, wherein in each commutation state:

(i) in response to the first control signal the driver circuit electrically connects the second terminal of the first coil to an upper voltage supply by establishing a first current path from the upper voltage supply to the second terminal of the first coil; and (ii) for applying forward torque to the rotor, in response to the second control signal the driver circuit electrically connects the second terminal of the second coil to a lower voltage supply by establishing a second current path from the lower voltage supply to the second terminal of the second coil, wherein the upper voltage supply is at a higher voltage level than the lower voltage supply, thereby causing a forward current to flow in the first and second coils to provide forward torque to the rotor;

otherwise, in response to the deceleration control signal for applying reverse torque to the rotor, the driver circuit electrically connects the second terminal of the second coil to the upper voltage supply during at least a portion of each commutation state by establishing a third current path from the upper voltage supply to the second terminal of the second coil, to allow BEMF induced currents to flow in the first and second coils, causing reverse torque to the rotor; and (2) a speed control circuit for:

(i) generating said first and second control signals to control the level and direction of the currents flowing in the first and second coils in each commutation state, and (ii) generating the deceleration control signal in response to a deceleration command for decelerating the rotor during at least a portion of each commutation state, whereby the driver circuit establishes the third current path during said at least a portion of each commutation state to allow BEMF induced currents to flow in the first and second coils, causing reverse torque to the rotor.

2. The motor driver of claim 1, wherein the driver circuit comprises:
  (a) an upper driver for each phase coil, wherein in response to the first control signal the upper driver corresponding to the first coil in each commutation state establishes the first current path between the second terminal of the first coil and the upper voltage supply, the upper driver comprising a first current controller for controlling a level of current through the first current path in response to the first control signal;
  (b) a lower driver for each phase coil, wherein in response to the second control signal the lower driver corresponding to the second coil in each commutation state establishes the second current path between the second terminal of the second coil and the lower voltage supply, the lower driver comprising a second current controller for controlling a level of current through the second current path in response to the second control signal.

3. The motor driver of claim 2, wherein the driver circuit further comprises a selector circuit responsive to the commutation state signals for selecting said first and second coils in each commutation state, whereby the selector circuit:
  (a) couples said first control signal to the upper driver of the first coil, and (b) couples said second control signal to the lower driver of the second coil.

4. The motor driver of claim 3, wherein the upper and the lower drivers for each phase coil are further responsive to the deceleration control signal from the speed control circuit, whereby in response to the deceleration control signal, during at least a portion of each commutation state:
  (a) the lower driver corresponding to the second coil maintains the second terminal of the second coil disconnected from the lower voltage supply; and
  (b) the upper driver corresponding to the second coil electrically connects the second terminal of the second coil to the upper voltage supply, causing a reverse current to flow in the first and second coils to provide reverse torque to the rotor.

5. The motor driver of claim 2, wherein the speed control circuit comprises:
  (a) a sensor for sensing a level of current flowing through said at least first and second coils during each commutation state;
  (b) a controller circuit for selecting a peak current level corresponding to a desired rotational speed of the rotor; and
  (c) a current control means coupled to the sensor and to the controller circuit for comparing a sensed current level to said peak current level and providing the first and second control signals to the first and the second current controllers, respectively, to control the level of current flowing through the first and second current paths and maintain said level of current at or below the peak current level.

6. The motor driver of claim 5, wherein the current control means comprises:
  (a) a comparator coupled to the sensor and to the controller circuit for comparing the sensed current level to the peak current level, and generating an output signal having a first state where the sensed current level is at or below the peak current level, and a second state where the sensed current level is above the peak current level;
  (b) drive current control means for generating said first and second control signals in response to the comparator output signal to maintain the level of current flowing through the first and the second current paths at or below the peak current level; and
  (c) a signal generator responsive to said deceleration command, for generating the deceleration control signal.

7. The motor driver of claim 1, wherein the electric motor comprises a brushless DC spindle motor having three phase coils.

8. A coil driver for a multi-phase wound electric motor having a rotor and multiple phase coils arranged as a stator, and a commutation phase generation means responsive to BEMF voltages in the phase coils for generating commutation state signals corresponding to commutation states for selecting at least a first and a second coil in each commutation state, such that when energized said at least first and second coils are capable of providing forward torque to the rotor based on the rotational position of the rotor relative to the phase coils, the coil driver comprising:
  (a) a driver circuit responsive to said commutation state signals and to current control signals including a first control signal and PWM control pulses, each pulse including an ON period signal and an OFF period signal, wherein during each commutation state:
    (1) in response to the first control signal the driver circuit electrically connects the second terminal of the first coil to an upper voltage supply by establishing a first current path from the upper voltage supply to the second terminal of the first coil; and
    (2) for each PWM control pulse, in response to the ON period signal the driver circuit electrically connects the second terminal of the second coil to a lower voltage supply by establishing a second current path from the lower voltage supply to the second terminal of the second coil, and in response to the OFF period signal the driver circuit electrically connects the second terminal of the second coil to the upper voltage supply by establishing a third current path from the upper voltage supply to the second terminal of the second coil, wherein the upper voltage supply is at a higher voltage level than the lower voltage supply;
  (b) a drive current controller for generating the first control signal to the driver circuit;
  (c) a pulse generator for generating a train of PWM control pulses to the driver circuit for controlling current flow in the first and second coils in response to speed control signals, each control pulse including:
    (1) an ON period signal indicating an ON period wherein the driver circuit establishes said second current path, wherein the length of the ON period is a function of the speed control signal, and
    (2) an OFF period signal indicating an OFF period wherein the driver circuit establishes said third current path; and
  (d) a speed control circuit for decelerating the rotor in response to a deceleration command by generating a speed control signal to the pulse generator to minimize the ON period in each PWM control pulse, wherein the pulse generator provides successive OFF period signals to the driver circuit during at least a portion of each commutation state, whereby the driver circuit maintains the second terminals of the first and the second coils electrically connected to only the upper voltage supply during said at least a portion of each commutation state to allow BEMF induced currents to flow in the first and second coils, causing reverse torque to the rotor.

9. The coil driver of claim 8, wherein the driver circuit comprises:
(a) a lower driver for each phase coil, wherein during each commutation state the lower driver corresponding to the second coil:
  (1) electrically connects the second terminal of the second coil to the lower voltage supply in response to said ON period signals, and
  (2) electrically disconnects the second terminal of the second coil from the lower voltage supply in response to said OFF period signals; and
(b) an upper driver for each phase coil, wherein:
  (i) in response to the first control signal in each commutation state the upper driver corresponding to the first coil establishes the first current path between the second terminal of the first coil and the upper voltage supply, and
  (ii) in response to the OFF period signals during each commutation state, the upper driver corresponding to the second coil electrically connects the second terminal of the second coil to the upper voltage supply by establishing the third current path.

10. The coil driver of claim 9 wherein the driver circuit further comprises a selector circuit responsive to the commutation state signals for selecting said first and second coils in each commutation state.

11. The coil driver of claim 8, wherein the speed control circuit comprises:
(a) a sensor for sensing a level of current flowing through the first and second coils during each commutation state;
(b) a controller circuit for selecting a peak current level corresponding to a desired rotational speed of the rotor; and
(c) a comparator coupled to the sensor and to the controller circuit for comparing the sensed current level to the peak current level, and for generating a speed control signal having:
  (1) a first state wherein the sensed current level is below the peak current level, and
  (2) a second state wherein the sensed current level is at or above the peak current level,
wherein, in response to the speed control signal the pulse generator generates the PWM control pulses such that each pulse includes:
  (1) said ON period signal corresponding to said first state of the speed control signal whereby the driver circuit electrically connects the second terminal of the second coil to the lower voltage supply until the level of current flowing through the first and second coils reaches the peak current level, and
  (2) said OFF period signal corresponding to said second state of the speed control signal whereby the driver circuit: (i) electrically disconnects the second terminal of the second coil from the lower voltage supply for the OFF period, and (ii) electrically connects the second terminal of the second coil to the upper voltage supply, and
wherein in response to said deceleration command, the controller circuit selects the peak current level such that the pulse generator minimizes the ON period in each PWM control pulse during at least a portion of each commutation state, and the pulse generator provides successive OFF signals to the driver circuit during said at least a portion of each commutation state, whereby the driver circuit maintains the first and the second coils electrically connected to only the upper voltage supply during said at least a portion of each commutation state to apply BEMF induced reverse torque to the rotor.

12. The coil driver of claim 11, wherein during said successive OFF periods throughout said at least a portion of each commutation state, reverse current flows in the first and second coils in a direction from the second coil to the first coil, generating magnetic fields around the first and second coils which induce reverse torque on the rotor.

13. The coil driver of claim 12 wherein the controller circuit effects deceleration of the rotor by selecting a peak current level substantially close to zero.

14. The coil driver of claim 8, wherein the speed control circuit generates the speed control signal to the pulse generator during at least a portion of each commutation state for decelerating the rotor, wherein the pulse generator reduces the ON period in each PWM control pulse to substantially zero and the pulse generator provides successive OFF signals to the driver circuit during said at least a portion of each commutation state, whereby the driver circuit maintains the first and the second coils electrically connected to only the upper voltage supply during said at least a portion of each commutation state to apply BEMF induced reverse torque to the rotor.

15. The coil driver of claim 8, wherein the electric motor comprises a brushless DC spindle motor having three phase coils.

16. A coil driver for a multi-phase wound electric motor having a rotor and multiple phase coils arranged as a stator, and a commutation phase generation means responsive to BEMF voltages in the phase coils for generating commutation state signals corresponding to commutation states for selecting at least a first and a second coil in each commutation state, such that when energized said at least first and second coils are capable of providing forward torque to the rotor based on the rotational position of the rotor relative to the phase coils, the coil driver comprising:
(a) a driver circuit responsive to said commutation state signals and to current control signals including a first control signal, a deceleration control signal and PWM control pulses, each pulse including an ON period signal and an OFF period signal, wherein during each commutation state:
  (1) in response to the first control signal the driver circuit electrically connects the second terminal of the first coil to an upper voltage supply by establishing a first current path from the upper voltage supply to the second terminal of the first coil; and
  (2) for each PWM control pulse, in response to the ON period signal the driver circuit electrically connects the second terminal of the second coil to a lower voltage supply by establishing a second current path from the lower voltage supply to the second terminal of the second coil, and in response to the OFF period signal the driver circuit electrically disconnects the second terminal of the second coil from the lower voltage supply, wherein the upper voltage supply is at a higher voltage level than the lower voltage supply; and
    in response to the deceleration control signal, the driver circuit electrically connects the second terminal of the second coil to the upper voltage supply during at least a portion of each commutation state by establishing a third current path from the upper voltage supply to the second terminal of the second coil,
(b) a drive current controller for generating the first control signal to the driver circuit;

(c) a pulse generator for generating a train of PWM control pulses to the driver circuit for controlling current flow in the first and second coils in response to speed control signals, each pulse including:
   (1) an ON period signal indicating an ON period having a length as a function of the speed control signal, and
   (2) an OFF period signal indicating an OFF period; and
(d) a speed control circuit for decelerating the rotor in response to a deceleration command by:
   (1) generating a speed control signal to the pulse generator to minimize the ON period in each PWM control pulse during at least portion of each commutation state, wherein the pulse generator provides successive OFF period signals to the driver circuit during said at least a portion of each commutation state, and
   (2) generating the deceleration control signal to the driver circuit to electrically connect the second terminal of the second coil to the upper voltage supply during said at least a portion of each commutation state, whereby the driver circuit maintains the first and the second coils electrically connected to only the upper voltage supply during said at least a portion of each commutation state to allow BEMF induced currents to flow in the first and second coils, causing reverse torque to the rotor.

17. The coil driver of claim 16, wherein the driver circuit comprises:
(a) a lower driver for each phase coil, wherein during each commutation state the lower driver corresponding to the second coil:
   (1) electrically connects the second terminal of the second coil to the lower voltage supply in response to said ON period signals, and
   (2) electrically disconnects the second terminal of the second coil from the lower voltage supply in response to said OFF period signals;
(b) an upper driver for each phase coil, wherein:
   (i) in response to the first control signal in each commutation state the upper driver corresponding to the first coil establishes the first current path between the second terminal of the first coil and the upper voltage supply, and
   (ii) in response to the deceleration signal, the upper driver corresponding to the first coil electrically connects the second terminal of the first coil to the upper voltage supply during at least a portion of each commutation state.

18. The coil driver of claim 17, wherein the driver circuit further comprises a selector circuit responsive to the commutation state signals for selecting said first and second coils in each commutation state.

19. The coil driver of claim 18, wherein the upper driver for each phase coil is further responsive to the deceleration control signal from the speed control circuit, whereby in response to the deceleration control signal the upper driver corresponding to the second coil in each commutation state electrically connects the second terminal of the second coil to the upper voltage supply during at least a portion of each commutation state, causing a reverse current to flow in the first and second coils to provide reverse torque to the rotor.

20. The coil driver of claim 16, wherein the speed control circuit comprises:
(a) a sensor for sensing the level of current flowing through the first and the second coils during each commutation state;
(b) a controller circuit for selecting a peak current level corresponding to a desired rotational speed of the rotor;
(c) a comparator coupled to the sensor and to the controller circuit for comparing the sensed current level the peak current level, and for generating a speed control signal having:
   (1) a first state wherein the sensed current level is below the peak current level, and
   (2) a second state wherein the sensed current level is at or above the peak current level,
wherein, in response to the speed control signal the pulse generator generates the PWM control pulses such that each pulse includes:
   (1) said ON period signal corresponding to said first state of the speed control signal whereby the driver circuit electrically connects the second terminal of the second coil to the lower voltage supply until the level of current flowing through the first and second coils reaches the peak current level, and
   (2) said OFF period signal corresponding to said second state of the speed control signal whereby the driver circuit electrically disconnects the second terminal of the second coil from the lower voltage supply for the OFF period; and
(d) a signal generator responsive to the deceleration command for generating the deceleration control signal;
wherein in response to the deceleration command the controller circuit selects the peak current level such that the pulse generator minimizes the ON period in each PWM control pulse, and the pulse generator provides successive OFF signals to the driver circuit during at least a portion of each commutation state; and
wherein in response to the deceleration signal the driver circuit electrically connects the second terminal of the second coil to the upper voltage supply and maintains the first and the second coils electrically connected to only the upper voltage supply during said at least a portion of each commutation state to apply BEMF induced reverse torque to the rotor.

21. The coil driver of claim 20 wherein the controller circuit effects deceleration of the rotor by selecting a peak current level substantially close to zero.

22. The coil driver of claim 16, wherein the speed control circuit generates the speed control signal to the pulse generator for decelerating the rotor, wherein the pulse generator reduces the ON period in each PWM control pulse to substantially zero and the pulse generator provides successive OFF signals to the driver circuit during said at least a portion of each commutation state.

23. The coil driver of claim 16, wherein the electric motor comprises a brushless DC spindle motor having three phase coils.

24. A method of driving a multi-phase wound electric motor having a rotor and multiple phase coils arranged as a stator, each phase coil having a first terminal and a second terminal, wherein the first terminals of the phase coils are connected together at a center tap, the method comprising the steps of:
(a) generating sequential commutation states in response to BEMF voltages in the phase coils;
(b) selecting at least a first and a second coil in each commutation state, such that when energized said at least first and second coils are capable of providing forward torque to the rotor based on the rotational position of the rotor relative to the phase coils; and
(c) in each commutation state:
   (1) driving the first coil by electrically connecting the second terminal of the first coil to an upper voltage supply; and (2) driving the second coil by:
  (i) for applying forward torque to the rotor, electrically connecting the second terminal of the second coil to a lower voltage supply, wherein the upper voltage supply is at a higher voltage than the lower voltage supply, otherwise
  (ii) for applying reverse torque to the rotor to decelerate the rotor, electrically connecting the second terminal of the second coil to the upper voltage supply during at least a portion of each commutation state, to allow BEMF induced currents to flow in the first and second coils, causing reverse torque to the rotor.

25. The method of claim 24 wherein generating the commutation states is performed by a phase locked loop.

26. The method of claim 24, wherein during each commutation state:
  (a) when the second terminal of the first coil is electrically connected to the upper voltage supply and the second terminal of the second coil is electrically connected to the lower voltage supply, forward current flows in a direction from the first coil to the second coil, inducing forward torque on the rotor; and
  (b) when the second terminals of the first and the second coils are electrically connected to the upper voltage supply during at least a portion of each commutation state, reverse current flows in a direction from the second coil to the first coil, inducing reverse torque on the rotor.

27. The method of claim 24, wherein the step of driving the second coil includes driving the second coil in response to a train of PWM control pulses, each control pulse including an ON period signal and an OFF period signal, wherein during each commutation state for applying forward torque to the rotor, in response to the ON period signal in each control pulse the second terminal of the second coil is electrically connected to the lower voltage supply, and in response to the OFF period signal the second terminal of the second coil is electrically disconnected from the lower voltage supply.

28. The method of claim 27, wherein the step of driving the second coil to apply reverse torque to the rotor includes:
  (1) generating the PWM control pulses during at least a portion of each commutation state wherein the ON period in each PWM control pulse is minimized, and the control pulses provide successive OFF period signals; and
  (2) in response to each OFF period signal electrically connecting the second terminal of the second coil to the upper voltage supply, whereby the second terminals of the first and the second coils remain electrically connected to the upper voltage supply during said at least a portion of each commutation state to allow BEMF induced currents to flow in the first and second coils, causing reverse torque to the rotor.

29. The method of claim 28, wherein during successive OFF periods throughout said at least a portion of each commutation state for decelerating the rotor, reverse current flows in the first and second coils in a direction from the second coil to the first coil, generating magnetic fields around the first and the second coils which induce reverse torque on the rotor and oppose rotation of the rotor in the forward direction.

30. The method of claim 29 wherein generating the train of PWM control pulses to decelerate the rotor includes generating the control pulses wherein the length of the ON period in each control pulse is substantially zero and the PWM control pulses include only successive OFF period signals during said at least a portion of each commutation state.

31. The method of claim 24 wherein the electric motor comprises a brushless DC spindle motor having three phase coils.

32. The method of claim 27, wherein the step of driving the second coil to apply reverse torque to the rotor includes, in response to a deceleration control signal:
  (1) generating the PWM control pulses during at least a portion of each commutation state wherein the ON period in each PWM control pulse is minimized, and the control pulses provide successive OFF period signals, and
  (2) electrically connecting the second terminal of the second coil to the upper voltage supply, whereby the second terminals of the first and the second coils remain electrically connected only to the upper voltage supply during said at least a portion of each commutation state to allow BEMF induced currents to flow in the first and second coils, causing reverse torque to the rotor.

33. The method of claim 32, wherein during successive OFF periods during said at least a portion of each commutation state for decelerating the rotor, reverse current flows in the first and second coils in a direction from the second coil to the first coil, generating magnetic fields around the first and the second coils which induce reverse torque on the rotor and oppose rotation of the rotor in the forward direction.

34. The method of claim 33, wherein generating the train of PWM control pulses to decelerate the rotor includes generating the control pulses wherein the length of the ON period in each control pulse is substantially zero and the PWM control pulses include only successive OFF signals during said at least a portion of each commutation state.

* * * * *